(12) United States Patent
Kharatishvili et al.

(10) Patent No.: US 11,874,796 B1
(45) Date of Patent: Jan. 16, 2024

(54) EFFICIENT GARBAGE COLLECTION IN OPTIMISTIC MULTI-WRITER DATABASE SYSTEMS

(71) Applicant: Amazon Technologies, Inc., Seattle, WA (US)

(72) Inventors: Tengiz Kharatishvili, Sammamish, WA (US); Alexandre Olegovich Verbitski, Woodinville, WA (US); Justin Levandoski, Seattle, WA (US); Niket Goel, Seattle, WA (US); Kamal Kunt Gupta, Belmont, CA (US); Xiaofeng Bao, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 16/586,235

(22) Filed: Sep. 27, 2019

(51) Int. Cl.
*G06F 15/16* (2006.01)
*G06F 16/16* (2019.01)
(Continued)

(52) U.S. Cl.
CPC ........ *G06F 16/162* (2019.01); *G06F 16/1734* (2019.01); *G06F 16/1767* (2019.01); *G06F 16/1873* (2019.01)

(58) Field of Classification Search
None
See application file for complete search history.

(56) References Cited

U.S. PATENT DOCUMENTS

| 5,197,148 A | 3/1993 | Blount et al. |
| 6,772,154 B1 | 8/2004 | Daynes et al. |

(Continued)

FOREIGN PATENT DOCUMENTS

WO    2020119050    6/2020

OTHER PUBLICATIONS

Backing Up and Archiving the Database. Database Administrator's Reference, Oracle Database Documentation Library 11g Release 2 (11.2), pp. 1-9, 2013. (Year: 2013).*

(Continued)

*Primary Examiner* — Alex Gofman
*Assistant Examiner* — Shelly X Qian
(74) *Attorney, Agent, or Firm* — Robert C. Kowert; Kowert, Hood, Munyon, Rankin & Goetzel, P.C.

(57) ABSTRACT

Systems and methods are disclosed to implement, in a multi-writer database system, a database engine node that optimistically sends queued purge operations to a backend storage system without waiting for acknowledgement of previous operations from the storage system. If a conflict is later detected for a particular operation, the database engine node may retry some portion of the purge operations in the queue. In embodiments, the purge operations are performed as part of a garbage collection phase of a multi-version concurrency control (MVCC) protocol, where unneeded versions of objects previously generated for isolated snapshots are deleted. In embodiments, the operations in the queue may be grouped so that a rejection of one operation in the group will cause the entire group to be retried. Because these purge operations are idempotent and directed to objects that are invisible, they may be freely retried in arbitrary order, without maintaining any rollback state.

20 Claims, 11 Drawing Sheets

(51) Int. Cl.
*G06F 16/18* (2019.01)
*G06F 16/17* (2019.01)
*G06F 16/176* (2019.01)

(56) References Cited

U.S. PATENT DOCUMENTS

| | | | |
|---|---|---|---|
| 7,266,702 | B2 | 9/2007 | Hotti |
| 7,620,659 | B2 | 11/2009 | Novik et al. |
| 7,707,219 | B1 | 4/2010 | Bruso et al. |
| 8,504,542 | B2 | 8/2013 | Chang et al. |
| 8,909,610 | B2 | 12/2014 | Reid et al. |
| 9,336,258 | B2 | 5/2016 | Bhattacharjee et al. |
| 9,613,078 | B2 | 4/2017 | Vermeulen et al. |
| 9,665,609 | B2 | 5/2017 | Andrei et al. |
| 10,127,260 | B2 | 11/2018 | Goel et al. |
| 2004/0117345 | A1 | 6/2004 | Bamford et al. |
| 2004/0177100 | A1 | 9/2004 | Bjorner et al. |
| 2005/0187891 | A1 | 8/2005 | Johnson et al. |
| 2006/0004885 | A1 | 1/2006 | Lubashev et al. |
| 2006/0212492 | A1 | 9/2006 | Jacobs et al. |
| 2007/0005664 | A1 | 1/2007 | Kodavalla et al. |
| 2007/0083530 | A1 | 4/2007 | Lakshminath et al. |
| 2011/0029490 | A1 | 2/2011 | Agarwal et al. |
| 2013/0124475 | A1* | 5/2013 | Hildenbrand ....... G06F 16/2315 707/E17.007 |
| 2016/0147814 | A1* | 5/2016 | Goel ................ G06F 16/2393 707/600 |
| 2016/0357791 | A1 | 12/2016 | Levandoski et al. |
| 2017/0357577 | A1* | 12/2017 | Lee ................ G06F 12/0269 |
| 2018/0011893 | A1 | 1/2018 | Kimura |
| 2018/0150360 | A1 | 5/2018 | Kwon et al. |
| 2019/0324673 | A1 | 10/2019 | Graefe |
| 2019/0325055 | A1 | 10/2019 | Lee et al. |

OTHER PUBLICATIONS

What is Amazon Relational Database Service (Amazon RDS)? https://docs.aws.amazon.com/AmazonRDS/latest/UserGuide, pp. 1-6, 2018. (Year: 2018).*

Lomet et al. Multi-Version Concurrency via Timestamp Range Conflict Management. 2012 IEEE International Conference on Data Engineering, pp. 714-725. (Year: 2012).*

Snapshot Isolation. https://jepsen.io/consistency/models/snapshot-isolation, 2018, pp. 1-3. (Year: 2018).*

Loesing et al. On the Design and Scalability of Distributed Shared-Data Databases. ACM SIGMOD'15, pp. 663-676. (Year: 2015).*

Binnig et al. Distributed snapshot isolation: global transactions pay globally, local transactions pay locally. The VLDB Journal (2014) 23:987-1011. (Year: 2014).*

Lomet et al. Multi-Version Concurrency via Timestamp Range Conflict Management. IEEE 28th ICDE, pp. 714-725. (Year: 2012).*

U.S. Appl. No. 16/586,497, filed Sep. 27, 2019, Justin Levandoski.

U.S. Appl. No. 16/586,563, filed Sep. 27, 2019, Tengiz Kharatishvili.

U.S. Appl. No. 16/586,355, filed Sep. 27, 2019, Tengiz Kharatishvili.

* cited by examiner

EFFICIENT GARBAGE COLLECTION IN OPTIMISTIC MULTI-WRITER DATABASE SYSTEMS

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling to meet demand, many computing-related systems or services are implemented as distributed applications, each application being executed on a number of computer hardware servers. For example, a number of different software processes executing on different computer systems may operate cooperatively to implement a computing service. When more service capacity is needed, additional hardware or software resources may be deployed to increase the availability of the computing service.

While adding additional computing resources can facilitate application scaling, doing so significantly increases the complexity of the distributed system when performing various operations. For example, a database hosted at a distributed system or application may allow multiple different processes implemented at separate computer systems to perform writes to the database. Because multiple writers can write to the database, distributed concurrency techniques are needed to ensure that writes are consistently performed across the distributed system, without causing undue inefficiencies on the various processes in the database system, such as garbage collection.

Figure 1:
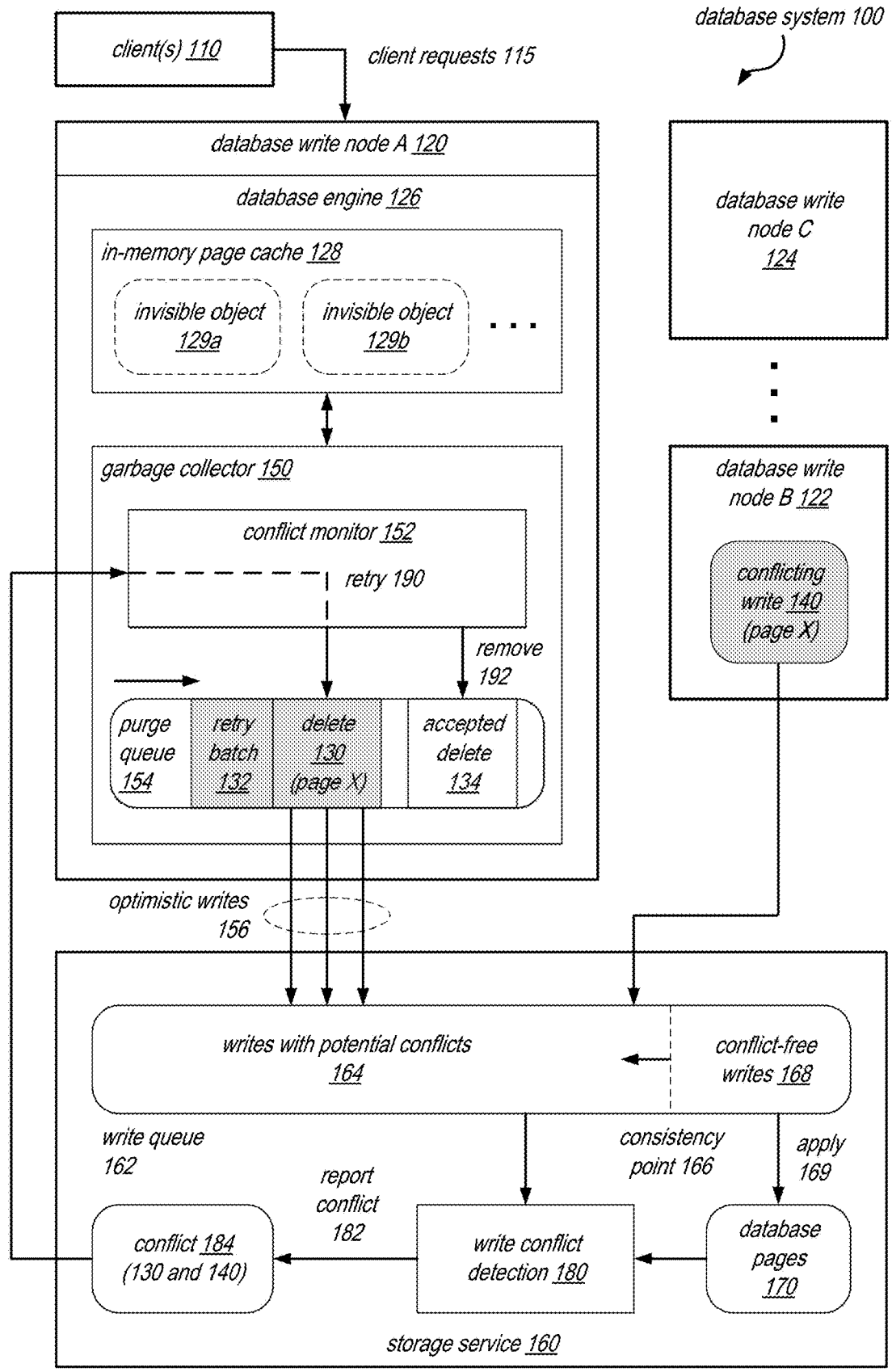
FIG. 1 is a block diagram illustrating an example optimistic multi-writer database that employs optimistic delete operations to implement efficient garbage collection, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement an optimistic multi-writer database system that employs optimistic delete operations to implement efficient garbage collection.

Database system may be implemented in a multi-master or multi-writer scheme, where multiple database engine nodes are able to generate write operations to a shared storage layer of the database. In some embodiments, such multi-writer database systems may be implemented in a decoupled architecture, where the individual database nodes operate independently to submit writes to the shared storage layer. In embodiments of such database systems, two writes from two different database nodes that update the same version of database page may be deemed to be conflicting writes at the storage layer, where only one of the two writes can succeed. To deal with such conflicts, the storage layer may serve as the arbiter of conflicts and report the conflicts and/or conflict resolutions to the database nodes. For example, the storage layer may resolve the conflicts based on which update obtains a quorum acknowledgment from a group of storage nodes. However, the database node will not know the status of its writes (accepted or rejected) until it receives a notification from the storage layer. Thus, under a "pessimistic" approach, committing the write operation requires an additional network round trip between the database node and the storage layer. Additionally, the write operation needs to wait for the time required for the storage layer to quorum resolve updates. Such an approach results in poor performance for writes in large-scale databases systems.

To improve performance, some embodiments of multi-writer database systems may generate write operations optimistically. That is, the multi-writer database will not use a global pessimistic protocol whereby writers must first reserve exclusive access to a piece of data before performing a write, or otherwise confirm that the write is conflict-free. Rather, database nodes may apply the write locally and send the write to shared storage, assuming that the write will be successful and that no other potentially conflicting writes exist in the system. Under this optimistic approach, high performance of writes may be achieved when workloads perfectly partition and do not naturally conflict.

One challenge in an optimistic multi-write database system is to efficiently perform internal writes generated within the database system, such as delete operations that are generated periodically in a background garbage collection process. In some database systems, the garbage collection process may be used to delete residual data that are no longer needed by the database system. For example, in a database system that implements a transactional currency control technique such as multi-versioned concurrency control (MVCC), the database system creates new versions for every transaction so as to not block one transaction from reading data being modified by another transaction. In an MVCC system, the purge or garbage collection process will clean up any versioning information that is no longer needed by the protocol. In an optimistic multi-write database system, these types of purge or delete operations on data pages can conflict with page writes from other nodes.

When the loser write of a conflict belongs to a transaction, the strategy to recover may simply involve performing a logical rollback of the actions that the write node had performed. However, for a non-transactional update as done during garbage collection, losing a conflict is more difficult to handle. Due to the non-transactional nature of the purge operations, there is no clear rollback information present for the garbage collector to undo its actions. The problem becomes more challenging if the driver of such garbage collection process does not expect the operation to fail and hence does not implement a retry strategy.

Accordingly, embodiments of an optimistic multi-writer database are described herein to provide a garbage collector that generates optimistic delete operations, to implement efficient garbage collection. In some embodiments, the efficient garbage collector will be implemented to exploit the idempotency and loose ordering properties of the delete operations, and perform validation of deletes only at certain checkpoints, without waiting for each individual delete operations to be confirmed at the storage layer. For example, a garbage collection process may perform two actions, which may delete a first object identified by identifier K1 from container C1 and a second object identified by identifier K2 from container C2. Given that both objects submitted to the garbage collection subsystem effectively invisible to the rest of the system (e.g. in the case of unneeded MVCC item versions), it does not matter in what order they are removed from the containers. There is no requirement that containers C1 and C2 be distinct. Further, retrying either of the two delete operations has no side effect on the correct state of the database. A previously deleted object will simply not be found in the memory state of the write node and the garbage collector will simply move on. Additionally, in some embodiments, there may be a possibility that a deleted object may be reinserted between retry attempts. To properly handle this possibility, the write node may perform a validation of the visibility (or lack thereof) of the object with respect to the rest of the system prior to issuing the retry. If the targeted object is determined to be visible, indicating that an intervening reinsertion was successful, the retry of the deletion will not be performed.

In some embodiments, the garbage collector may employ a batch retry strategy to further improve efficiency. In some embodiments, a sequence of delete operations may be organized into batches that are validated at checkpoints, and if any operation fails after the last checkpoint, all operations in the batch or window may be retried. In some embodiments, the maintenance of the checkpoint can be done in a rolling fashion, preferably asynchronously, so as to ensure minimal rework overhead in case of a failure. The batch retry strategy does not violate correctness because of the loose ordering requirement and idempotent nature of the delete operations that are done by the garbage collector.

Advantageously, embodiments of the optimistic multi-writer database system described herein improve the functioning of database systems to provide a number of technical benefits to such database systems. In one respect, the batch retry strategy may be more efficient than retrying delete operations individually. A batched retry strategy spares the garbage collector from having to monitor a large number of delete operations individually, and allows the garbage collector to operate as a background process, which can remain idle most of the time. Additionally, in some embodiments, the sequence of delete operations submitted to the garbage collector will be proximally related, so that the rejection of a first delete in the sequence will likely predict the rejection of other nearby deletes (e.g., because a sequence of consecutive deletes are all directed to the same page).

In another respect, the disclosed optimistic garbage collector can be used to easily implement efficient garbage collection on top of a storage system where multiple database writes are optimistically writing to a shared storage backend. The disclosed techniques allow the garbage collector to issue delete operations optimistically in bursts, without waiting for confirmation of previously submitted deletes. When a conflict is detected, the garbage collector can simply retry the delete operation (or a batch of delete operations), without having to perform a complicated rollback process. Such an efficient garbage collector can be implemented on the database write nodes themselves, without extensive changes to the core functionality of the backend storage system.

In yet another respect, the disclosed efficient garbage collection features do not add significant burdens to the operations of the storage system. In some embodiments, a delete operation that is to be retried as part of a batch may be checked against the memory state (e.g. the page cache) of the write node. If the page cache indicates that there has not been a rejection of the delete at the storage system (e.g. the cached page still reflects the delete), the write node may not resend the delete again to the storage system. This initial checking prevents large amounts of retry traffic from being sent to the storage system, and avoids the bloating the database write logs with large amounts of unneeded retry operations. These and other features and benefits of the write tracking transaction features are described in further detail below, in connection with the figures.

FIG. 1 is a block diagram illustrating an example optimistic multi-writer database that employs optimistic delete operations to implement efficient garbage collection, according to some embodiments.

As shown, the depicted database system 100 is implemented using a number of database write nodes, including node A 120, node B 122, and node C 124. In some embodiments, each of these database nodes 120, 122, and 124 may implement a database engine 126 of the database system. For example, in some embodiments, the database engine 126 may implement components to write and query data in the database. In some embodiments, the database may be a Structured Query Language (SQL) database that organizes its data in tables. In some embodiments, the database may be a non-SQL database. As shown, each database write node may be used to independently service client requests 115 from clients 110. In some embodiments, the database write nodes may interact directly with the clients 110. In some embodiments, the database write nodes may be implemented behind a client-facing endpoint, request router, or load balancer, so that they interact with the clients 110 through the particular frontend component.

As shown, in the depicted example, the database 100 also includes a storage service 160, which is shared among the database write nodes A, B, and C. In some embodiments, the storage service 160 may be a log-structured storage service that maintains a database log which logs the write operations sent by the database write nodes. As shown, in some embodiments, the received write operations may be queued in sequence, in a write queue 162. In some embodiments, after a contiguous sequence of write operations are verified to be conflict free, the write operations may be logged into the database log and may be considered durable in the database. The storage service 160 may then apply 169 the logged write operations in sequence order, to the database pages 170 of the database. The database pages 170 may store the data of the database in a more organized order (e.g., in tables and in individual records), so that they can be easily fetched in response to queries handled by the database nodes. In some embodiments, the backend storage of the database 100 may not be log-based. In some embodiments, the backend storage of the database 100 may not be implemented as a storage service. For example, in some embodiments, the backend storage may simply be a shared storage volume that provides a storage call interface to the database nodes. However, in some embodiments, the backend storage may be implemented as an independently running service, which may include a large fleet of auto-scaled nodes with associated storage devices. In some embodiments, the storage nodes and storage devices of the storage service 160 may be divided over multiple geographical area of availability zones, so that data in the database can be partitioned or replicated across the different areas or zones to improve database performance and/or availability.

In some embodiments, the database write nodes A, B, and C, may be implemented in a decoupled or loosely coupled scheme, so that before the nodes apply writes (e.g. page writes) locally (e.g. to a page cache at the node) and send write requests to the storage service 160, they do not first coordinate among one another to check for write conflicts. That is, the database write nodes may apply the writes and send the writes to the storage service 160 optimistically, assuming that the writes do not cause any page conflicts. In some embodiments, a page write operation on a page will assume a previous state of the page, which may be cached at individual ones of the writer nodes. In some embodiments, the cached states on each of the writer nodes may be slightly different. In some embodiments, the correctness of the database 100 requires all page writes in the database to be serializable to a global sequence of write operations. Accordingly, in some embodiments, two page writes may constitute a conflict if they concurrently update the same version of the same page. In the case of such page conflicts, only one of the two write operations will be allowed to proceed at the storage service 160, and the other one will be rejected to be retried later.

In some embodiments, the storage service 160 may be configured to detect these page conflicts. For example, as shown, the storage service 160 may implement write queue 162 that includes a set of operations with potential conflicts 164, and a set of conflict-free operations 168. The storage service 160 may gradually check operations in the set 164 and move those operations without page conflicts to the set 168. In some embodiments, the sets 164 and 168 may be two different queues. In some embodiments, the set 168 may be implemented as the database log. In some embodiments, the checking of conflicts may be performed by an operation conflict detection component 180, as shown. In some embodiments, the conflict detection component may check each operation to ensure that its expected state of the page being updated matches the latest state of the page as known to the storage service. If not, this means that an intervening operation has modified the page before the new operation, and the new operation must be rejected. In some embodiments, the rejection may be reported to the database node that issued the rejected write, which may cause that database node to refresh (e.g. fetch) the current version of the page from the storage service.

As shown, in some embodiments, the dividing line between the conflict-free operations 168 and the operations with potential conflicts 164 may be a consistency point 166 of the database. In some embodiments, page writes after this consistency point may be guaranteed by the storage service to be conflict free across all of the database writer nodes. Thus, LSNs after the consistency point 166 becomes a part of the official history of the database and eventually applied to the database pages 170. In some embodiments, page writes or LSNs in the set 168 may be guaranteed to be durable. It is noted that although the figure shows the write queue 162 to be a single data structure, in some embodiments, the operations may be stored in other types of data structures, for example, a series of separate queues implemented by the storage service.

As shown, in the illustrated example, database node A 120 may implement an in-memory page cache 128, which may maintain a view of the database for the database node A 120. In some embodiments, this view may include a subset of the pages of the database that have been recently read or written by the database write node A. In some embodiments, the contents of this page cache 128 may vary from one write node to another. If page write conflict is detected subsequent to an optimistic page write, the page write may be rolled back in the node's page cache. However, as discussed, because the write operations used in garbage collection are delete operations, which are idempotent, the write node does not need to perform a rollback. Rather, the write node only needs to retry the delete operation again.

As shown in this example, the page cache 128 includes a number of invisible objects 129a and 129b. In some embodiments, these invisible objects may represent objects (e.g. data items or versions of objects) that have already expired or are no longer needed by the database. In some embodiments, these invisible objects cannot be deleted immediately, but must be garbage collected at a later time (e.g., via the garbage collector 150). In some embodiments, the invisible objects 129 may be data item versions that are generated in a multi-version concurrency control (MVCC) protocol. Per the MVCC protocol, such versions may no longer be needed when no active transactions overlap or can see these versions. Accordingly, these versions can be garbage collected. In some embodiments, the invisible objects 129 may simply be tomstoned data items or objects, which have been deleted from the database but are kept for a period of time. These tombstoned data items or object are also garbaged collected using the garbage collector 150.

In some embodiments, the garbage collector 150 may be implemented as a subsystem or module in the database engine 126. In some embodiments, the garbage collector may be run as a background service or process. In some embodiments, the garbage collector 150 may remain idle when the database engine 126 is busy with other tasks (e.g. user transactions), and only execute when the database engine 126 is not otherwise busy.

As shown, the garbage collector 150 may implement a purge queue 154, which may hold a list, range, or sequence of delete operations that are to be performed on pages of the database in order to carry out garbage collection. The order that the delete operations are added to the queue 154 may vary depending on the embodiments. For example, in MVCC, unneeded object versions may be detected during normal reads or writes of a table, and delete operations for those object versions may be added to the queue when the versions are detected. In some embodiments, the garbage collector 150 may simply sweep a table for unneeded object versions in a periodic fashion. In some embodiments, the purge queue 154 may hold delete operations that have already been sent to the storage service 160. In some embodiments, the delete operations in the queue may not have been sent to the storage service, but are instead waiting to be applied to the page cache 128. As discussed, the delete operations in the purge queue 154 may be sent to the storage service or applied to the page cache optimistically, so that the sending 156 or applying of one delete operation does not wait for the completion of earlier delete operations. This optimistic approach of processing deletes provides drastic performance improvements for the garbage collection process.

As shown, the garbage collector 150 may implement a conflict monitor 152, which may be configured to receive reported conflicts from the storage service 160. As shown in this example, delete operation 130 in the purge queue modifies page X. This delete operation 130 conflicts with a conflicting write operation 140 generated by node B 122, which also modifies page X. Because the two nodes are not aware of one another, the two operations are concurrently modifying the same page, which in some embodiments represent a conflict. Accordingly, as shown, the write conflict detection component 180 of the storage service detects this conflict 184. In some embodiments, the storage service 160 then choose a winner, in this case operation 140, and rejects and notifies 182 the loser, in this case operation 130. As shown, this conflict 184 is then received by the conflict monitor component 152 at write node A. In some embodiments, the conflict monitor 152 may be configured to monitor conflicts for all delete operations in the purge queue 154, until it is confirmed that a delete operation has been accepted at the storage service 160, at which time it is then removed from the purge queue 154.

As shown, the queue contains an accepted delete operation 134, and that operation can then be removed 192 from the queue. The acceptance of a delete operation may be conveyed to the conflict monitor in a number of ways. In some embodiments, the storage service 160 may provide an acknowledgement to the conflict monitor regarding individual delete operations. In some embodiments, the storage service 160 may periodically indicate to the write node the current consistency point 166 of the database. If this consistency point is above the log sequence number associated with the delete operation 134, then the conflict monitor may infer that the delete operation 134 has been accepted. In some embodiments, the write node may explicitly perform a read operation from the storage service to determine the current contents of a page or the database consistency point, and use this information to determine whether a delete operation 134 has been accepted.

However, if the conflict monitor 152 detects that a delete in the queue 154 is rejected due to a conflict, the conflict monitor may then cause the delete operation 130 to be retried 190. In some embodiments, retrying the delete operation 130 may involve resending the delete to the storage service 160. In some embodiments, the retry may include reapplying the delete operation to the in-memory page cache 128 of the write node. In some embodiments, the retry may simply involve adding the delete operation 130 to the queue again. As discussed, because these delete operations in the garbage collection process are generally idempotent and unordered, they can be freely retried without impacting the correctness of the database.

As shown, in some embodiments, when a delete operation 130 is retried, it may be retried along with a batch 132 of other delete operations in the queue. As discussed, in some embodiments, this batch retry strategy may enhance the garbage collector's efficiency because often one rejected delete operation may predict rejections of other nearby deletes in the queue. For example, in some embodiments, delete operations on the same table, or versions of a same data item, may be added to the queue as a batch. Thus, a rejection of one delete in the batch will likely be followed by additional rejections of subsequent deletes. Moreover, in some embodiments, the batch retry approach spares the conflict monitor 152 from having to monitor each operation individually. Rather, the monitor 152 may simply verify whether all operations in the entire batch have been accepted, at a particular checkpoint. This verification of the batch is must less time and resource consuming, and allows the garbage collector 150 to operate more efficiently as a background process. It is noted that in the normal course of operation, no conflicts are detected for the delete operations in the queue, and they are simply removed as accepted at the storage service. However, in the rare event of a conflict, the disclosed techniques allow the garbage collector to quickly and correctly handle the conflict, without having to maintain sophisticated monitoring or rollback state for the delete operations.

Figure 2:
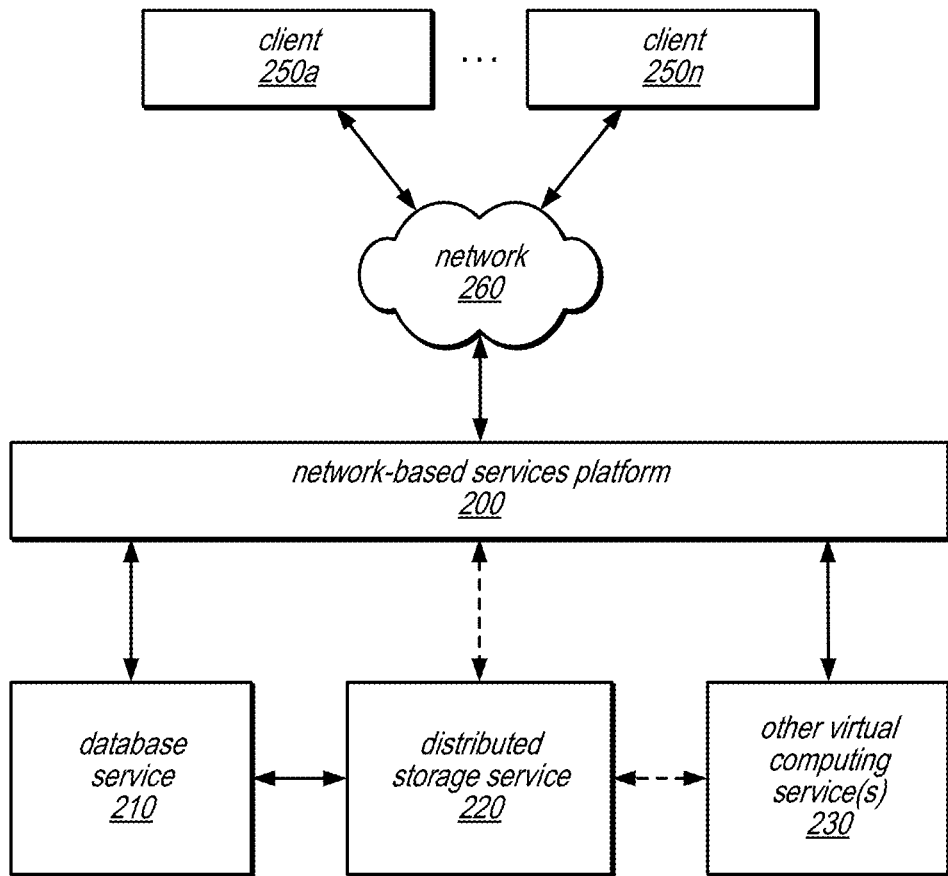
FIG. 2 is a block diagram illustrating a service system architecture that implement a database service that provides optimistic concurrency for a multi-writer database hosted in the service, according to some embodiments.

FIG. 2 is a block diagram illustrating a service system architecture that implement a database service that provides optimistic concurrency for a multi-writer database hosted in the service, according to some embodiments. In some embodiments, the clients 250 may be the clients 110 of FIG. 1, the database service 210 may implement the database system 100 of FIG. 1, and the distributed storage service 220 may be the storage service 160 of FIG. 1.

In the illustrated embodiment, a number of clients (shown as clients 250a-250n) interact with a web services platform 200 via a network 260. Web services platform 200 may interface with one or more instances of a database service 210, a storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a request to generate a snapshot, etc.). For example, a given client 250 may include a suitable version of a web browser, or may include a plug-in module or other type of code module that may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application that interacts directly with web services platform 200. In some embodiments, client 250 may generate web services requests according to a Representational State Transfer (REST)-style web services architecture, a document- or message-based web services architecture, or another suitable web services architecture.

In some embodiments, a client 250 (e.g., a database service client) may provide access to web services-based storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of any particular storage system service model. In some embodiments, the details of interfacing to Web services platform 200 may be coordinated by client 250 and the operating system or file system on behalf of applications executing within the operating system environment.

Clients 250 may convey web services requests (e.g., a snapshot request, parameters of a snapshot request, read request, restore a snapshot, query, write, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, web services platform 200 may implement one or more service endpoints to receive and process web services requests, such as requests to access data pages (or records thereof). For example, web services platform 200 may include hardware and/or software to implement a particular endpoint, such that an HTTP-based web services request directed to that endpoint is properly received and processed. In one embodiment, web services platform 200 may be implemented as a server system to receive web services requests from clients 250 and to forward them to components of a system that implements database service 210, distributed storage service 220 and/or another virtual computing service 230 for processing. In other embodiments, web services platform 200 may be implemented as a number of distinct systems (e.g., in a cluster topology) implementing load balancing and other request management features to dynamically manage large-scale web services request processing loads. In various embodiments, web services platform 200 may support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, the platform 200 may also implement user authentication and access control procedures. For example, for a given web services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding web services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent one interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through web services platform 200 to provide storage of databases or other information for applications other than those that rely on database service 210 for database management. This is illustrated in FIG. 2 by the dashed line between web services platform 200 and distributed storage service 220. In such embodiments, clients of the distributed storage service 220 may access distributed storage service 220 via network 260 (e.g., over the Internet). In some embodiments, a virtual computing service 230 may receive storage services from distributed storage service 220 (e.g., through an API directly between the virtual computing service 230 and storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Figure 3:
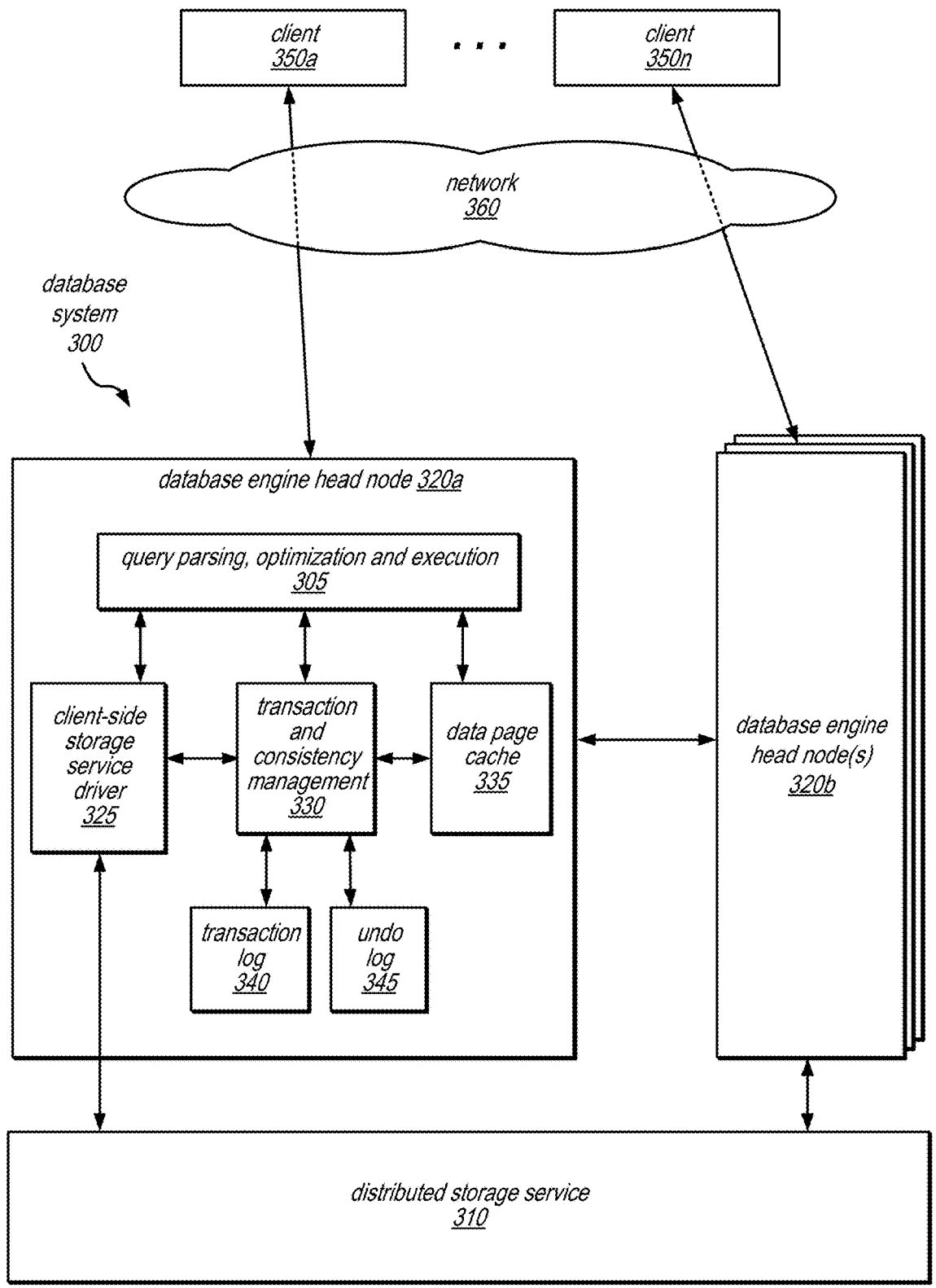
FIG. 3 is a block diagram illustrating various components of an optimistic multi-writer database system that includes multiple database writer nodes and a separate distributed storage service, according to some embodiments.

FIG. 3 is a block diagram illustrating various components of an optimistic multi-writer database system that includes multiple database writer nodes and a separate distributed storage service, according to some embodiments. In some embodiments, the database system 300 may be the database system 100 of FIG. 1, the database engine head nodes 320a and 320b may be implemented using the database write nodes 120, 122, and 124 of FIG. 1, and the distributed storage service 310 may be the storage service 160 of FIG. 1.

As shown, database system 300 includes one or multiple respective database engine head nodes 320 for each of several databases and a storage service 310 (which may or may not be visible to the clients of the database system, shown as clients 350a-350n). For example, database engine head node 320a may serve as an access point for providing read and write access to a database. As illustrated in this example, one or more of clients 350a-350n may access a database head node 320 via network 360 (e.g., these components may be network-addressable and accessible to the clients 350a-350n). However, storage service 310, which may be employed by the database system to store data pages of one or more databases (and redo log records and/or other metadata associated therewith) on behalf of clients 350a-350n, and to perform other functions of the database system as described herein, may or may not be network-addressable and accessible to the clients 350a-350n, in different embodiments. For example, in some embodiments, distributed storage service 310 may perform various storage, access, change logging, recovery, log record manipulation, and/or space management operations in a manner that is invisible to clients 350a-350n.

As previously noted, each database instance may include multiple database engine head nodes 320 that receives requests (e.g., requests that cause writes such as update or insert requests, etc.) from various client programs (e.g., applications) and/or subscribers (users), then parses them, optimizes them, and develops a plan to carry out the associated database operation(s). In this example, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As shown, database engine head node 320*a* may also include a transaction and consistency management component 330, which may be responsible for providing transactionality and consistency in the database instance of which database engine head node 320*a* is a component. For example, this component may be responsible for ensuring the Atomicity, Consistency, and Isolation properties of the database instance and the transactions that are directed that the database instance, such as applying undo log records to generate prior versions of tuples of a database in order to roll back changes not visible for performing a query. As shown, database engine head node 320*a* may also include a transaction log 340 and an undo log 345, which may be employed by transaction and consistency management component 330 to track the status of various transactions and roll back any results of transactions that do not commit.

Note that each of the other database engine head nodes 320 illustrated in this figure (e.g., 320*a* and 320*b*) may include similar components and may perform similar functions for queries received by one or more of clients 350*a*-350*n* and directed to the respective database instances of which it is a component.

In some embodiments, the storage systems described herein may organize data in various logical volumes, segments, and pages for storage on one or more storage nodes. For example, in some embodiments, each database may be represented by a logical volume, and each logical volume may be segmented over a collection of storage nodes. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. As described in detail herein, the storage nodes may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on a storage device; rather there may be an allocation map in each storage device describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of memory, generally of fixed size. In some embodiments, each page may be a block of memory (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, a log page may be a type of page that is used to store log records (e.g., redo log records or undo log records). In some embodiments, log pages may be identical in size to storage pages. Each log page may include a header containing metadata about that log page, e.g., metadata identifying the segment to which it belongs, in some embodiments. Note that a log page may be a unit of organization and may not necessarily be the unit of data included in write operations, in some embodiments. For example, in some embodiments, during normal forward processing, write operations may write to the tail of the log one sector at a time.

In some embodiments, log records (e.g., the individual elements of a log page) may be of several different classes. For example, user log records (ULRs), may be created and understood by users/clients/applications of the storage system, and may be used to indicate changes to user data in a volume, in some embodiments. Control log records (CLRs), may be generated by the storage system and may contain control information used to keep track of metadata such as the current unconditional volume durable LSN (VDL), in some embodiments. Null log records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page, in some embodiments. In some embodiments, log record types may be identified by GUIDs (rather than by integers or enums), which may simplify versioning and development, especially for ULRs.

In some embodiments, a payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size, in some embodiments. In addition, most log records may include additional parameters or data specific to that log record type, and this additional information may be considered the payload of that log record, in some embodiments. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages, in some embodiments.

Note that when storing log records in the log of a segment, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage, in some embodiments; otherwise the storage may be referred to as being out-of-band, in some embodiments. In some embodiments, the payloads of most large ULRs may be stored out-of-band.

In some embodiments, user pages may be the byte ranges (of a fixed size) and alignments thereof for a particular volume that are visible to users/clients of the storage system. User pages may be a logical concept, and the bytes in particular user pages may or not be stored in any storage page as-is, in some embodiments. The size of the user pages for a particular volume may be independent of the storage page size for that volume, in some embodiments. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware, in some embodiments.

In some embodiments, a storage node may be a single virtual machine that on which storage node server code is deployed. Each storage node may contain multiple locally attached storage devices, and may provide a network API for access to one or more segments, in some embodiments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

In various embodiments, storage devices may be a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. A storage device is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments, in some embodiments.

Figure 4:
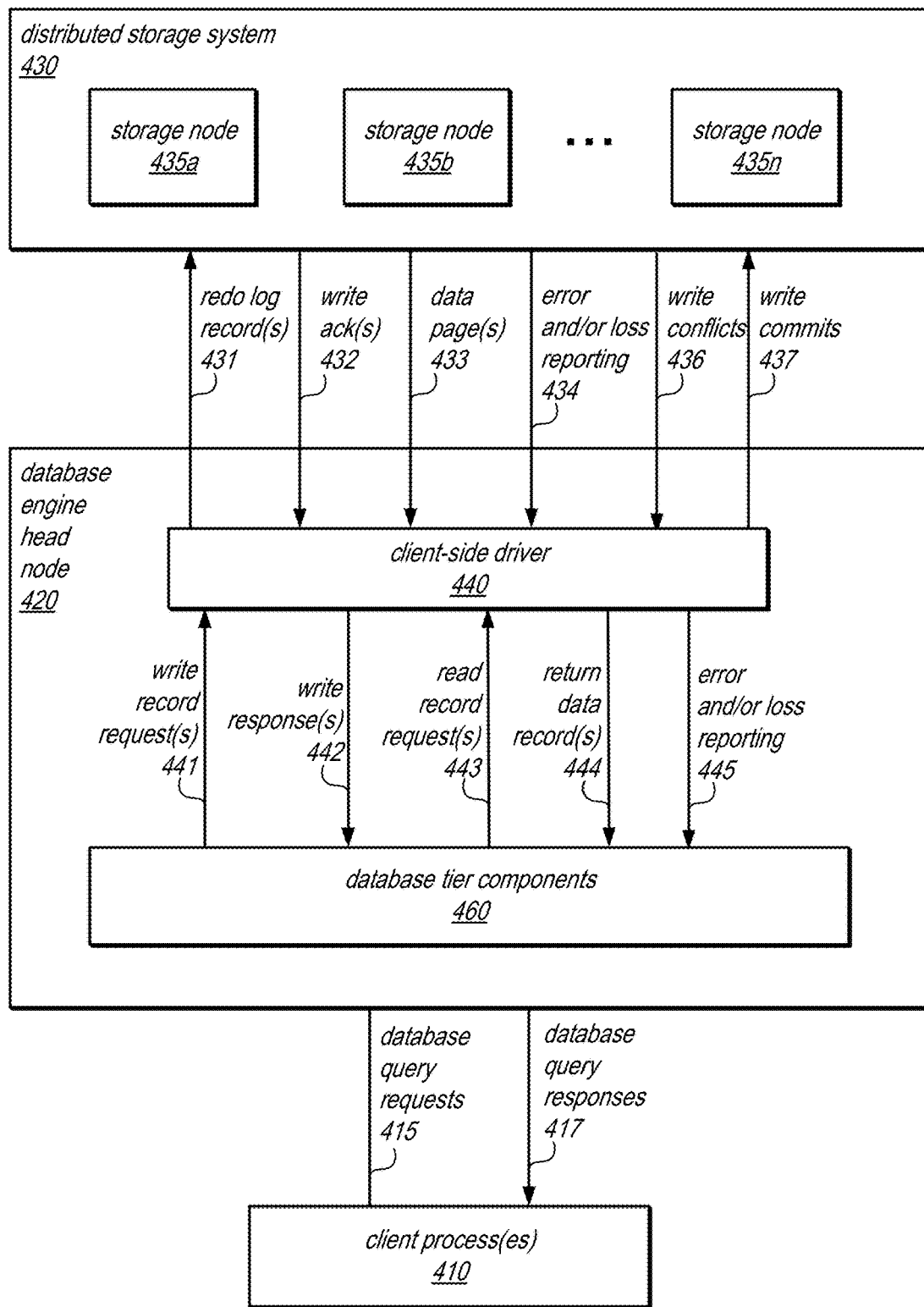
FIG. 4 is a block diagram illustrating various interactions between database writer nodes within an optimistic multi-writer database that implements optimistic concurrency, according to some embodiments.

FIG. 4 is a block diagram illustrating various interactions between database writer nodes within an optimistic multi-writer database that implements optimistic concurrency, according to some embodiments. In some embodiments, the database engine head node 420 may be the database write node 120 of FIG. 1, and the distributed storage system 430 may be the storage service 160 of FIG. 1.

As shown, one or more client processes 410 may store data to one or more databases maintained by a database system that includes a database engine head node 420 and a distributed storage system 430. As shown, database engine head node 420 includes database tier components 460 and client-side driver 440 (which serves as the interface between distributed storage system 430 and database tier components 460). In some embodiments, database tier components 460 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 410 may send database query requests 415 (which may include read and/or write requests targeting data stored on one or more of the storage nodes 435*a*-435*n*) to database tier components 460, and may receive database query responses 417 from database tier components 460 (e.g., responses that include write acknowledgements and/or requested data). Each database query request 415 that includes a request to write to a page may be parsed and optimized to generate one or more write record requests 441, which may be sent to client-side driver 440 for subsequent routing to distributed storage system 430. In this example, client-side driver 440 may generate one or more redo log records 431 corresponding to each write record request 441, and may send them to specific ones of the storage nodes 435 of distributed storage system

430. Distributed storage system 430 may return a corresponding write acknowledgement 423 for each redo log record 431 to database engine head node 420 (specifically to client-side driver 440). In some embodiments, storage nodes 435 may return write conflicts 436 (although in other embodiments write conflicts 436 may be included or not as part of write acknowledgements 432). For example, write conflicts may indicate writes that were successfully received and logged, but not committed as they conflict with other writes. Write commits 437 may be sent to indicate which conflicting writes can be committed, in some embodiments. In some embodiments, not illustrated, requests to cancel or otherwise exclude writes may be sent or requests to store one or more different log records that reconcile writes instead of previously stored log records (that individual reflect the reconciled writes) may be sent. Client-side driver 440 may pass these write acknowledgements to database tier components 460 (as write responses 442), which may then send corresponding responses (e.g., write acknowledgements) to one or more client processes 410 as one of database query responses 417.

In this example, each database query request 415 that includes a request to read a data page may be parsed and optimized to generate one or more read record requests 443, which may be sent to client-side driver 440 for subsequent routing to distributed storage system 430. In this example, client-side driver 440 may send these requests to specific ones of the storage nodes 435 of distributed storage system 430, and distributed storage system 430 may return the requested data pages 433 to database engine head node 420 (specifically to client-side driver 440). Client-side driver 440 may send the returned data pages to the database tier components 460 as return data records 444, and database tier components 460 may then send the data pages to one or more client processes 410 as database query responses 417.

In some embodiments, various error and/or data loss messages 434 may be sent from distributed storage system 430 to database engine head node 420 (specifically to client-side driver 440). These messages may be passed from client-side driver 440 to database tier components 460 as error and/or loss reporting messages 445, and then to one or more client processes 410 along with (or instead of) a database query response 417.

In some embodiments, the APIs 431-437 of distributed storage system 430 and the APIs 441-445 of client-side driver 440 may expose the functionality of the distributed storage system 430 to database engine head node 420 as if database engine head node 420 were a client of distributed storage system 430. For example, database engine head node 420 (through client-side driver 440) may write redo log records or request data pages through these APIs to perform (or facilitate the performance of) various operations of the database system implemented by the combination of database engine head node 420 and distributed storage system 430 (e.g., storage, access, change logging, recovery, and/or space management operations). As illustrated in the figure, distributed storage system 430 may store data blocks on storage nodes 435*a*-435*n*, each of which may have multiple attached storage devices. In some embodiments, distributed storage system 430 may provide high durability for stored data block through the application of various types of redundancy schemes.

Note that in various embodiments, the API calls and responses between database engine head node 420 and distributed storage system 430 (e.g., APIs 431-434) and/or the API calls and responses between client-side driver 440 and database tier components 460 (e.g., APIs 441-445) may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 420 and/or distributed storage system 430.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality.

In various embodiments, multiple writers implemented at different respective database engine head nodes may be allowed to access a same database while maintaining a single, global read view of the database. Optimistic concurrency may be implemented for writes performed by the different writers using shared storage and asynchronous I/O, in various embodiments. In some embodiments, database engine head nodes (or other write nodes) may be seamlessly added or removed for a database without disruption of database clients.

In some embodiments, database write nodes may use an asynchronous write model to achieve higher write performance with reasonable cost to read performance. Moreover, applying optimistic concurrency techniques may allow the write node, for instance, when writing a log record to continue performing other requests without waiting for the write of the log record to the log to be finalized or to be resolved on a conflict, in some embodiments.

In at least some embodiments, the isolation level supported by multiple writers may include a read-uncommitted isolation level. In some embodiments, the isolation level supported by multiple writers may include a repeatable read isolation level and/or a read-committed isolation level. In such scenarios, isolation may perform the same as if the database only had a single writer when the transactions affecting the rows are on the same instance, in some embodiments. Transactions issued to different instances may have snapshot isolation applied so that the first committed rule is applied and transactions that run into conflicts are aborted, in some embodiments. Different outcomes for such isolation levels may result depending on transaction origin (e.g., a transaction issued on the same write node may succeed where the same transaction issued on another write node would fail), in some embodiments. In some embodiments, a serializable isolation level may not be supported with multiple writers.

Figure 5:
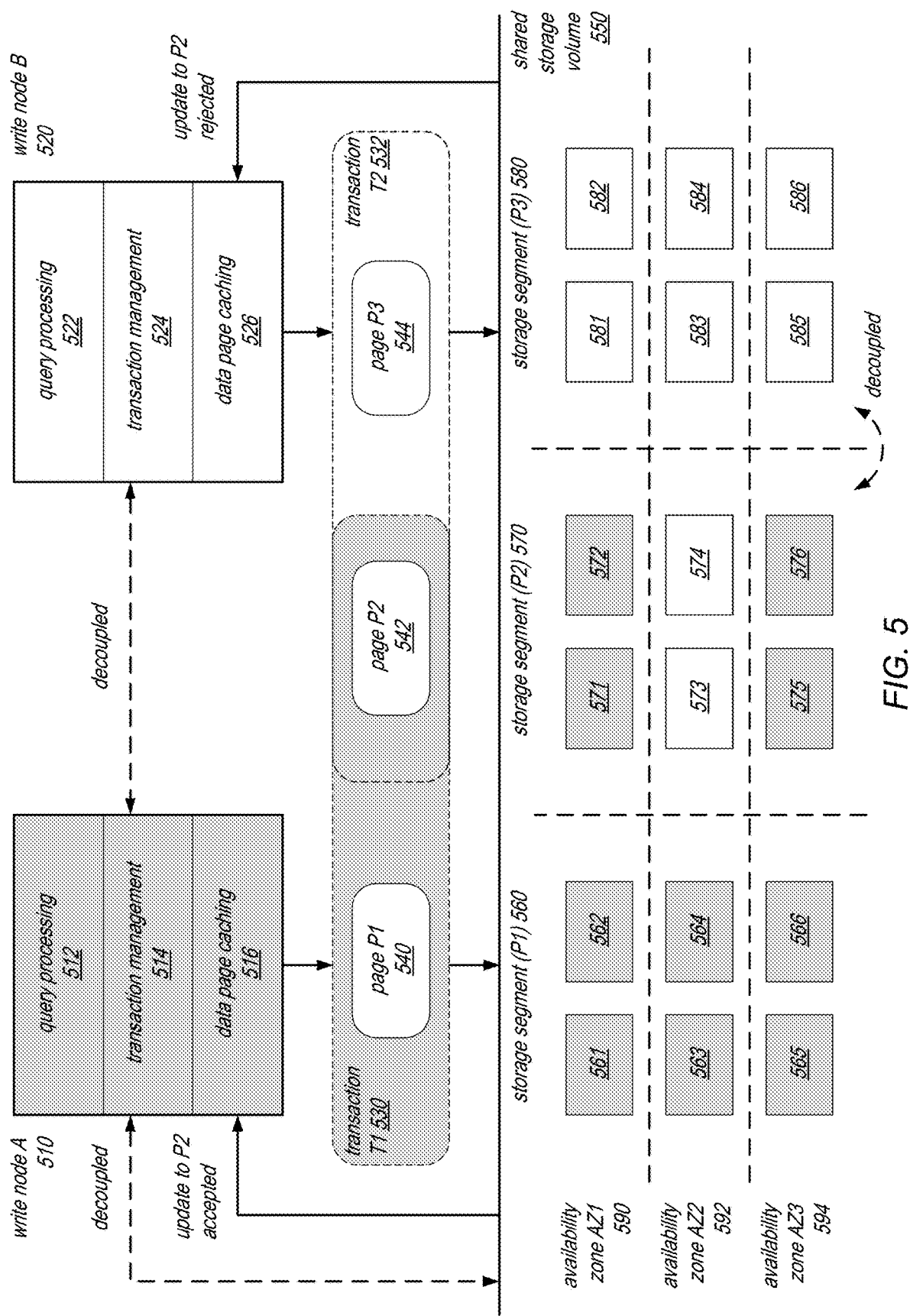
FIG. 5 is a block diagram illustrate a shared storage volume that accepts and rejects page writes based on page conflicts in a multi-writer database that implements optimistic concurrency, according to some embodiments.

FIG. 5 is a block diagram illustrate a shared storage volume that accepts and rejects page writes based on page conflicts in a multi-writer database that implements optimistic concurrency, according to some embodiments. In this example, the write nodes A 510 and B 520 may be the write nodes 120, 122, or 124, as discussed in connection with FIG. 1, and the shared storage volume 550 may be implemented by the storage service 160 of FIG. 1.

As shown, each database write node 510 and 520 in this example includes a number of functional layers or components, which are used to implement a database engine. In some embodiments, the query processing components 512 and 522 may be the query parsing, optimization and execution component 305 of FIG. 3, the transaction management components 514 and 524 may be the transaction and consistency management component 330 of FIG. 3, and data page caching component 516 may be implemented using the data page cache 335 of FIG. 3.

In some embodiments, as shown, the database system may be implemented in a decoupled architecture, where different components (e.g. the database nodes and portions of the shared storage volume 550) are implemented as independent components that can function largely independently with minimal cross-component knowledge or coordination. In some embodiments, separate components are implements on separate execution platforms (e.g. hardware servers or virtual machine instances). In some embodiments, each component may manage only a divisible portion of the functionality or data of the database system. The failure of any one independent component will not cause a global failure of the database system, and each independent component may implement their own scheme for auto-scaling and redundancy.

As shown, in this example, the write nodes A and B are decoupled. Thus, the write nodes may execute independently on different execution systems, and the two nodes may not rely on one another for core database engine functionality (e.g. to incoming SQL requests). As discussed, in some embodiments, the two write nodes may both write the shared storage volume 550 in an optimistic fashion, without coordinating with each other to resolve conflicts ahead of time. In some embodiments, the data page cache of the two nodes may reflect different states of the database.

As shown, the database write nodes 510 and 520 are also decoupled from the storage layer (e.g. the shared storage volume 550). In this respect, the storage layer and the database write nodes divide the functionality of database system. In some embodiments, the storage layer will handle all durability aspects of the database system, while the database write nodes will handle other aspects of the database system on top of the storage layer. In some embodiments, the database write nodes 510 and 520 may interact with the shared storage volume 550 via defined service interface. For example, the write nodes may submit page write operations to the storage layer, which will in turn queue and apply the page write operations to the state of the database. This type of separation represents a departure from traditional database systems, where the upper functional layers of the database system tightly coupled to the storage layer, in an integrated functional stack, which is sometimes implemented on the single server.

In some embodiments, the shared storage volume 550 or the storage layer may also implement a conflict resolution functionality, in addition to its durability functions. As discussed, in multi-writer database systems with optimistic database write nodes, the page writes submitted by the write nodes may occasional represent conflicts. For example, two writes from two different nodes may concurrently attempt to modify the same page, which may represent a conflict condition. Thus, in some embodiments, the storage layer may implement a conflict resolution protocol to both detect and resolve conflicting writes.

As shown, in this example, the storage layer is actually implemented by a number of storage nodes (nodes 561-566, 571-576, 581-586), which may be separate instances of virtual machines or virtualized instance of storage devices. As shown in this example, the storage nodes are divided into three storage segments 560, 570, and 580, and also three different availability zones 590, 592, and 594. In some embodiments, each storage segment may be assigned a range of pages for a database. In some embodiments, each availability zone may represent a zone or environment of computing infrastructure that execute independently from other availability zones (e.g. having separate power sources). By distributing storage nodes across multiple availability zones, the database system ensure that it can remain highly available in the face of the failure of one or multiple availability zones. As shown, in some embodiments, the storage segments of the shared volume are decoupled from each other. For example, even the complete failure of all storage nodes in one storage segment will not directly cause a failure of another storage segment.

As shown, in this example, each storage segment in the volume 550 is replicated across six storage nodes. In this type of system, a quorum-based conflict resolution protocol may be implemented. As shown, nodes A and B in this example have issued two transactions T1 530 and T2 532. The two transactions are issued on top of the cached state of the database seen by the two database nodes, and the two transactions are issued concurrently, so that neither transaction is aware of the other transaction. As shown, transaction T1 includes a page update to page A 540 and page B 542, while transaction T2 includes a page update to page C 544 and also page B 542. In this case, the two transactions include a pair of conflict page writes to page B 542.

When these page writes are sent to the storage layer or shared storage volume 550, the different storage nodes of the storage layer may receive the write operations at different times, and may arrive at different conclusions about how to resolve the conflict. As shown, at storage segment 560, which stores page P1, all storage nodes have accepted the update to page P1 (as indicated by the shading of nodes 561-566). At segment 580, which stores page P3, all storage nodes have accepted the update to page P3 (as indicated by the white shading of nodes 581-586). However, at segment 570, which stores page P2, some of the storage nodes (571, 572, 575, and 576) have resolve the write conflict on page P2 in favor of the write issued by write node A (as part of transaction T1), and other storage nodes (573 and 574) have instead resolved the conflict in favor of the write issued by write node B (as part of transaction T2). These nodes are shaded according to how the have resolved the conflict. In this example, the storage layer may implement a quorum-based conflict resolution protocol, where the storage layer will accept the write (and reject the other conflicting write) when a sufficient number (a "quorum") of storage nodes have accepted the winning write. In this example, the quorum needed to accept a write may be four of the six storage nodes for a particular storage segment (i.e. a majority). Because the write issued by write node A has been accepted by four storage nodes in segment 570, this write is deemed to be the winning write. Accordingly, storage nodes 573 and 574 will be overruled and will persist the winning write from node A.

As shown, in some embodiments, when a conflict is resolved, the storage layer will report back to the database write nodes (nodes A and B) whether their submitted writes have been accepted by the storage layer. In this example, the storage layer notifies to node A that its write of page P2 is accepted, and notifies node B that its write of page P2 is rejected. It is then up to write node B to rollback the transaction T2 532, or any other operations, as a result of the rejection of its write to page P2. In some embodiments, the rollback process may involve multiple write operations, as the conflict resolution process at the storage layer may take some time.

In some embodiments, the write nodes (e.g. node A) may not commit a write in its cache state until it receives a confirmation from the storage layer that that write has been accepted at the storage layer. In some embodiments, the storage layer may report a consistency point (e.g. consistency point 166 of FIG. 1), to the database nodes, which may represent the highest LSN of writes sent to the storage layer that have been accepted. Thus, if a write node A determines that the current database consistency point has moved beyond its pending writes (e.g. writes to pages P1 and P2), it may commit the result of those writes locally.

Figure 6A:
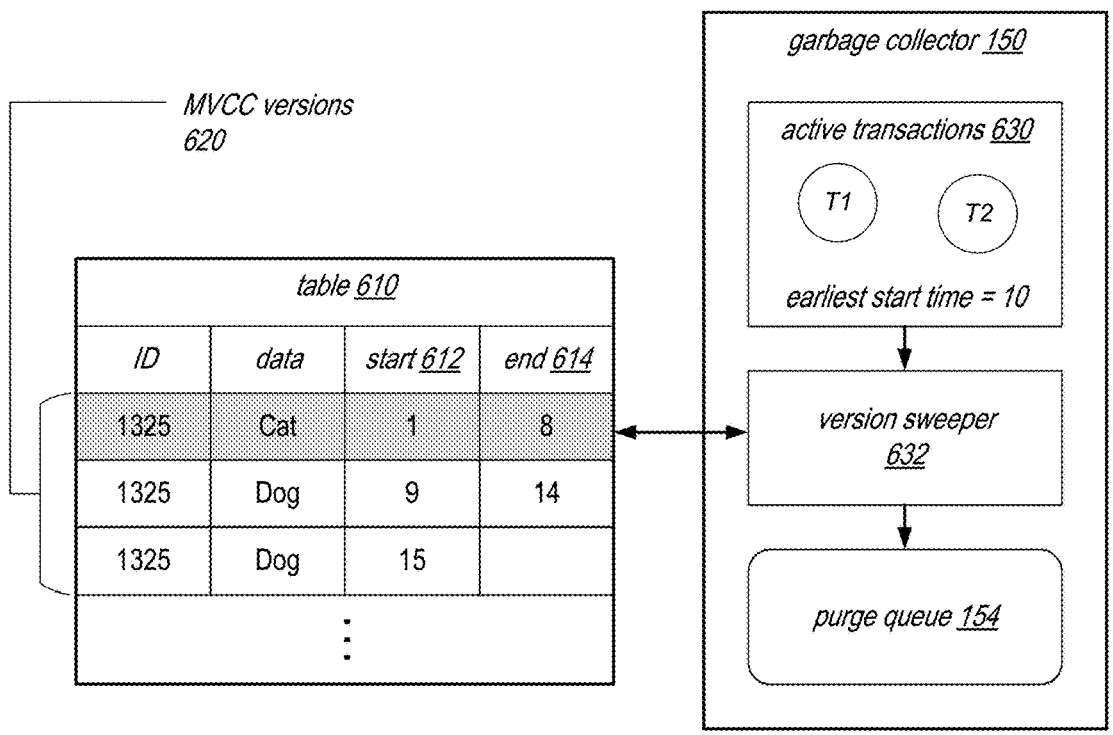
FIG. 6A is a logical block diagram illustrating a garbage collector that removes data item versions created as part of a multi-version concurrency control (MVCC) protocol, according to some embodiments.

FIG. 6A is a logical block diagram illustrating a garbage collector that removes data item versions created as part of a multi-version concurrency control (MVCC) protocol, according to some embodiments.

As shown in the figure, in database systems that implement the MVCC protocol, multiple versions of data items or records may be generated in a table 610. In this example, the same data item with ID (e.g. primary key) 1325 has three different versions. As will be appreciated by those skill in the art, the MVCC protocol will generate these versions for different transactions operating on the database, to present each transaction and isolated snapshot or read view of the database, without having to wait for other transactions to complete. As shown, in some embodiments, each MVCC version 620 may indicate metadata such as a start timestamp 612 and an end timestamp 614, which may determine whether two given transactions are concurrent. In MVCC, an object or item version may be maintained after a transaction's completion, to allow other pending transactions to determine any potential conflicts with the committed transaction. When there are no other active transactions 630 that can conflict with the committed transaction, the item versions created by the committed transaction can be garbage collected.

As shown, some embodiments of the garbage collector 150 may implement an MVCC garbage collector. In some embodiments, the garbage collector 630 may be aware of the active transactions 630 in the database, and make a decision of which MVCC versions 620 to purge based on metadata such as the versions' timestamps. In this example, the colored version has a visibility window from time point 1 to 8, and the earliest start time for the active transactions 630 is currently 10. Accordingly, none of the active transactions can conflict with the transaction that was responsible for that version, and that version can be garbage collected.

As shown, in some embodiments, the garbage collector may implement a version sweeper 632 that periodically or opportunistically checks the table 610 for item versions that are no longer needed, and then add delete operations to delete these versions to the purge queue 154. It is noted that the order in which the delete operations are added to the queue 154 may vary from embodiment to embodiment. It is further noted that in some embodiments, the garbage collector 150 may not be the component that is selecting which versions delete, but simply receive the versions to garbage collect from another external component of the database system.

Figure 6B:
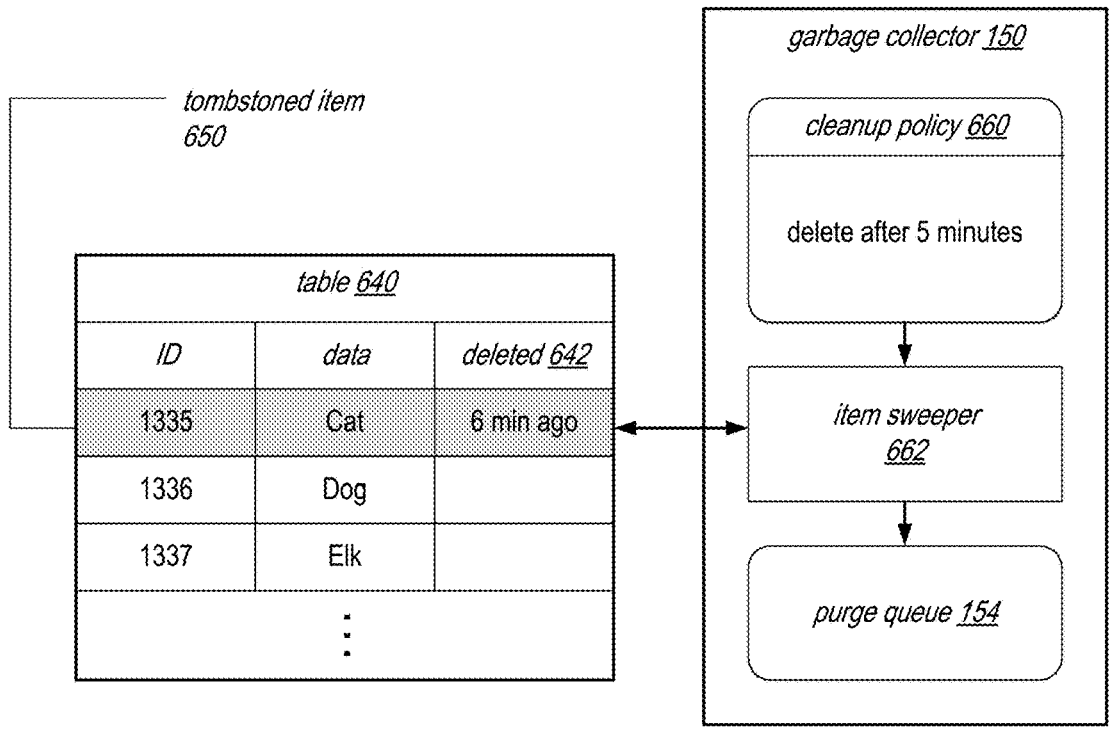
FIG. 6B is a logical block diagram illustrating a garbage collector that removes tombstoned data items in a database, according to some embodiments.

FIG. 6B is a logical block diagram illustrating a garbage collector that removes tombstoned data items in a database, according to some embodiments.

As shown, the figure depicts another type of garbage collector 150 that may be configured to remove tombstoned items 650 in a table 640. As may be appreciate by those skilled in the art, in some embodiments, when an item is deleted in a table, the database system may not immediately remove the item, but instead only tag the item for later deletion. In some embodiments, tagged or tombstoned items may be made invisible to clients or components external to the database, but may remain visible to certain internal components of the database system. Tombstoning may be employed in database systems for a variety of reasons, such as for example to maintain consistency among multiple writers of the table 650.

As shown, in this example, the data item with ID 1335 has been tombstoned. In some embodiments, tombstoned items may maintain metadata such as a deleted attribute 642, which may include information that is used to determine when the tombstoned item should be cleaned up or garbage collected. As shown in this example, the garbage collector 150 may operate according to a cleanup policy 660, which indicates that tombstoned items will be deleted after 5 minutes. Depending on the embodiment, the cleanup policy for tombstoned items may be dependent on a variety of conditions.

As shown, in this example, the garbage collector 150 may implement an item sweep 662 that sweeps the table to check for tombstoned items according to the policy 660. If any items are identified for garbage collection, a delete operation is generated and added to the purge queue 154. As discussed, the garbage collector 150 may optimistically perform the delete operations, and then monitor the purge queue 154 for any conflicts at the storage layer. If any conflicts are detected, the garbage collector 154 may retry the conflicted operation(s).

Figure 7A:
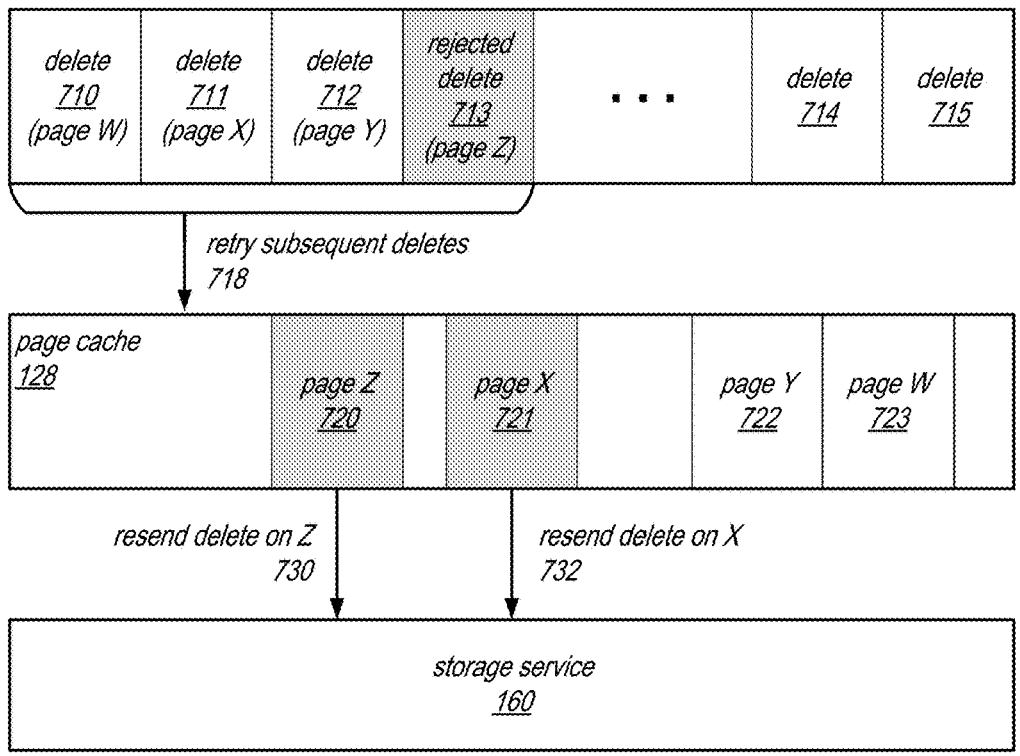
FIGS. 7A, 7B, and 7C illustrate different strategies of retrying delete operations in batches following a detected conflict in an optimistic multi-writer database, according to some embodiments.
Figure 7B:
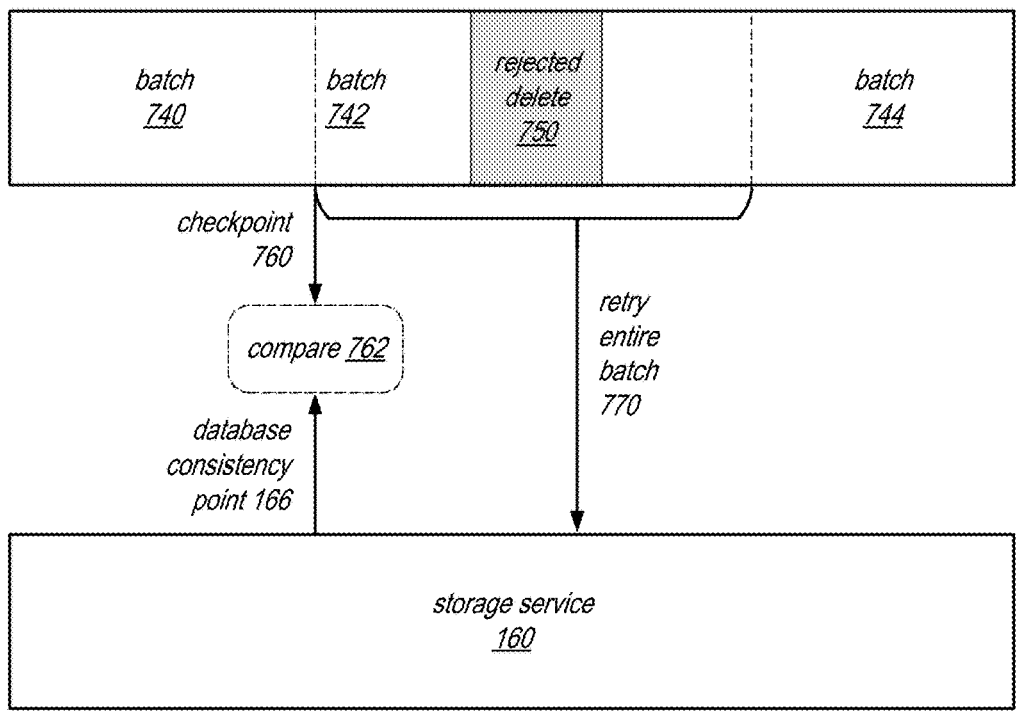
Figure 7C:
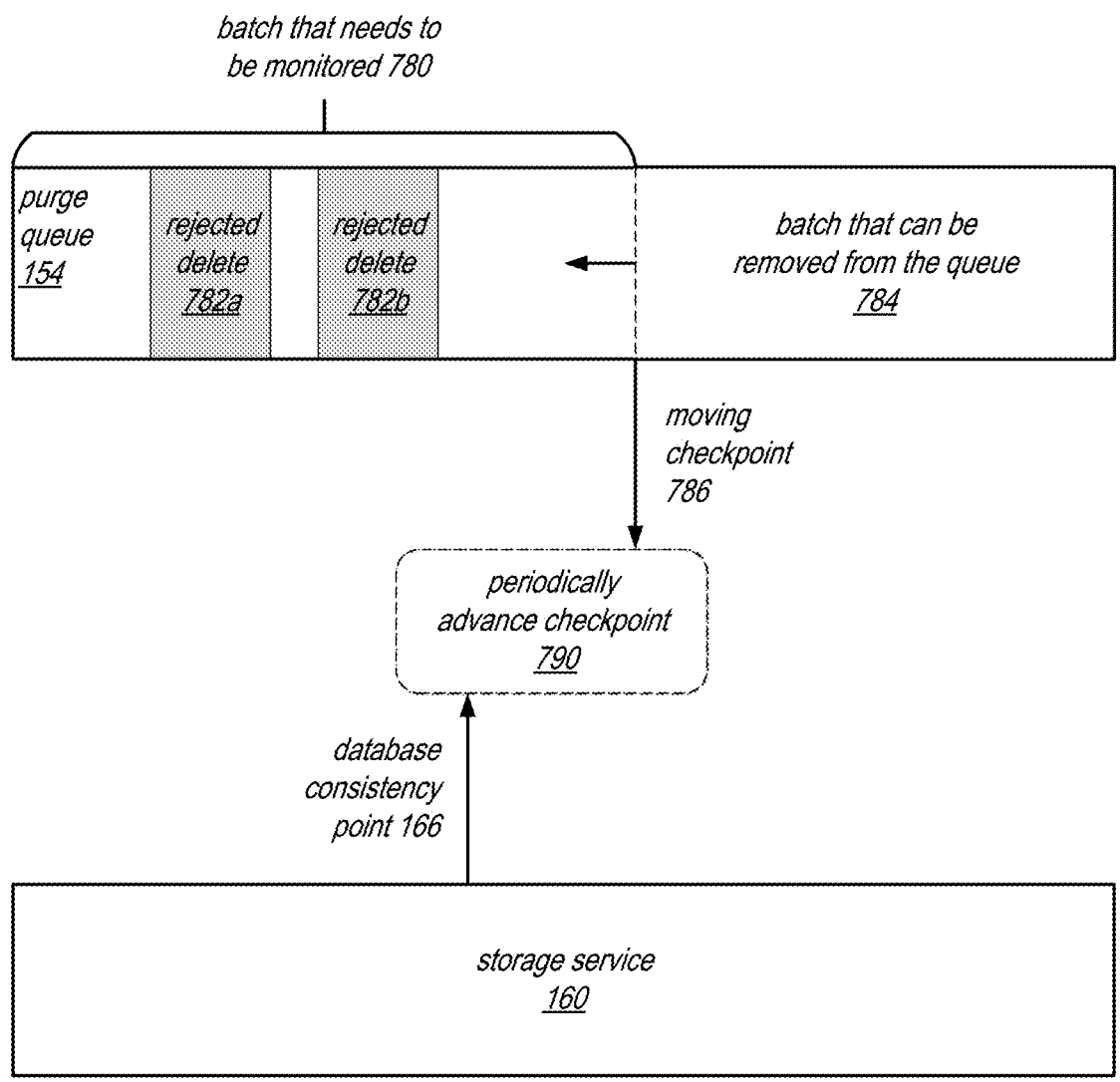

FIGS. 7A, 7B, and 7C illustrate different strategies of retrying delete operations in batches following a detected conflict in an optimistic multi-writer database, according to some embodiments.

FIG. 7A depicts a first batch retry strategy where multiple subsequent delete operations are retried when a rejection is detected for a first delete. As shown, the figure depicts one embodiment of the purge queue 154, which maintains a sequence of deletes on different pages (deletes 710-715) that are being monitored for conflict. As shown, in this example, delete 713 to page Z has been reported as having a conflict (e.g. from the storage service 160), and is rejected by the storage service.

In this example, in response to the rejection of delete 713, all subsequent deletes 710, 711, and 712 in the purge queue 154 are retried 718, along with the rejected operation 713 itself. As discussed, in some embodiments, these deletes may be retried because they are likely to also be rejected by the storage service, even though the storage service may not have made the determination yet. However, because the delete operations are idempotent, they may be freely retried without affect the correctness of the garbage collection process. Additionally, this retry strategy may simply the monitoring task of the garbage collector and allow the garbage collector to maintain less monitoring state. In some embodiments, once the rejection of delete 713 is received, the garbage collector may no longer need to monitor any further rejections for deletes 710, 711, and 712. In some embodiments, once the rejection of delete 713 is received, operations 710-713 may all be removed from the purge queue and added back again.

As shown, in some embodiments, the a retry 718 of a delete operation may involve first reapplying the delete operations to the page cache 128 of the database write node. In some embodiments, when a write operation is rejected, the database write node may immediate revert or rollback the page written back to its state prior to the write. Thus, the retry must also be applied to the in-memory page state of the write node. In some embodiments, when the delete is applied again to the page cache 128, the write node may check whether the delete operation is actually needed or whether it actually caused any change to the page. In some embodiments, the write node may detect that a delete operation is attempt to delete an object or item that has already been deleted, and thus not reapply the delete operation at all. In that case (if the delete operation is not actually performed or performed without effect), the write node may not resend the delete operation to the storage service again, because it simply amounts to a no-op.

As shown in this example, when the four deletes 710-713 are retried, only two of the deletes are actually reapplied in the page cache. As shown, only the delete operations on page Z 720 and page X 721 are performed, as indicated by the colored pages 720 and 721. This may be because both pages Z and X were reverted back due to rejections of deletes 713 and 711. However, the deletes 710 and 712 were not performed, because the deletes on those pages were accepted and pages W and Y were not reverted. Accordingly, in this example, only the deletes on X and Z are resent (operations 730 and 732) to the storage service. By filtering retried deletes using the page cache in this manner, the garbage collector dramatically reduces the amount of retries that are sent to the storage service 160. This optimization thus reduces network traffic and also reduces the amount of log entries that are stored and processed by the storage layer.

FIG. 7B depicts another batch retry strategy. In this example, the delete operations in the purge queue 154 are divided into batches of consecutive sub-sequences. As shown, the queue 154 currently has three batches 740, 742, and 744. In this example, if any delete operation (e.g. delete 750) in a batch is rejected by the storage service, the entire batch (here batch 742) is retried 770. In some embodiments, each individual batch may represent a group of related delete operations that are likely to experience conflict together, for example, deletes on a same table, or deletes of a set of related data objects that are commonly modified together. In some embodiments, the ordering of the batches does not matter. Thus, even though batch 744 was initially placed in the purge queue before batch 740, a retry of these two batches may have the reverse order.

In some embodiments, each individual batch may be validated as a unit. As shown, a batch (e.g. batch 742) may be associated with a checkpoint 760, which represents an endpoint of the batch. In some embodiments, the delete operations may be log entries with respective log sequence numbers, and the checkpoint 780 may be the last log sequence number in the batch. As shown, the storage service 160 may provide, either on demand or periodically on its own, the current database consistency point 166, as discussed in connection with FIG. 1. In some embodiments, this database consistency point 166 may be the highest log sequence number that have been accepted at the storage service. In some embodiments, the write node may periodically compare 762 the database consistency point 166 with the checkpoint 760 of the batch, and if the database consistency point is greater than the checkpoint, the batch 742 will be known to be entirely accepted at the storage service. In that event, the entire batch 742 may be removed from the purge queue atomically as a unit, so that these deletes are no longer monitored by the garbage collector for conflict. Advantageously, by only validating at the checkpoint, the garbage collector is freed from having to monitor each delete operation individually. This batched validation strategy thus simplifies the monitoring logic and reduces resource consumption of the garbage collector.

FIG. 7C depicts yet another batching strategy in monitoring the delete operations of the garbage collector. As shown in this example, the garbage collector may maintain a moving checkpoint 786. This moving checkpoint 786 may define the boundary between those deletes in the queue that still need to be monitored 780, and those deletes that can be removed from the queue 784. As shown, the batch 780 that needs to be monitored include deletes that are still in limbo and may experience conflicts at the storage layer, such as deletes 782a and 782b. On the other hand, the delete operations in the batch 784 may be past the database consistency point 166 (since a last checkpoint update), and they can no longer be rejected at the storage layer.

In some embodiments, when a retry is performed, the garbage collector may retry only the first rejected delete (e.g. delete 782b) and all subsequent deletes in the batch 780. In some embodiments, a batch retry may retry all deletes in the batch 780. In some embodiments, the garbage collector may not remove delete operations 784 immediately on an individual basis, but perform the removal periodically as a batch. This approach works well with garbage collectors that are executed as background processes, which may wake up only occasionally.

As shown, in some embodiments, to advance the moving checkpoint 786, the garbage collector may periodically move 790 the checkpoint to match the current database consistency point 166. Thus, the checkpoint 786 is not advanced one operation at a time, but only at certain times that are convenient for the garbage collector. In some embodiments, the advancement of the checkpoint 786 may be performed asynchronously.

Accordingly, as may be understood, the garbage collector in some embodiments does not need to take action on any individual delete operation. Any reported conflicts or rejections from the storage layer may simply be recorded to be handled when the garbage collector next wakes up. When the garbage collector wakes up, it will advance the checkpoint 786, remove the batch 784 from the queue, and retry some or all of the batch 780 remaining in the queue, and then go back to sleep. The garbage collector process does not need to remain awake to perform actions on any individual rejected delete operations.

Figure 8:
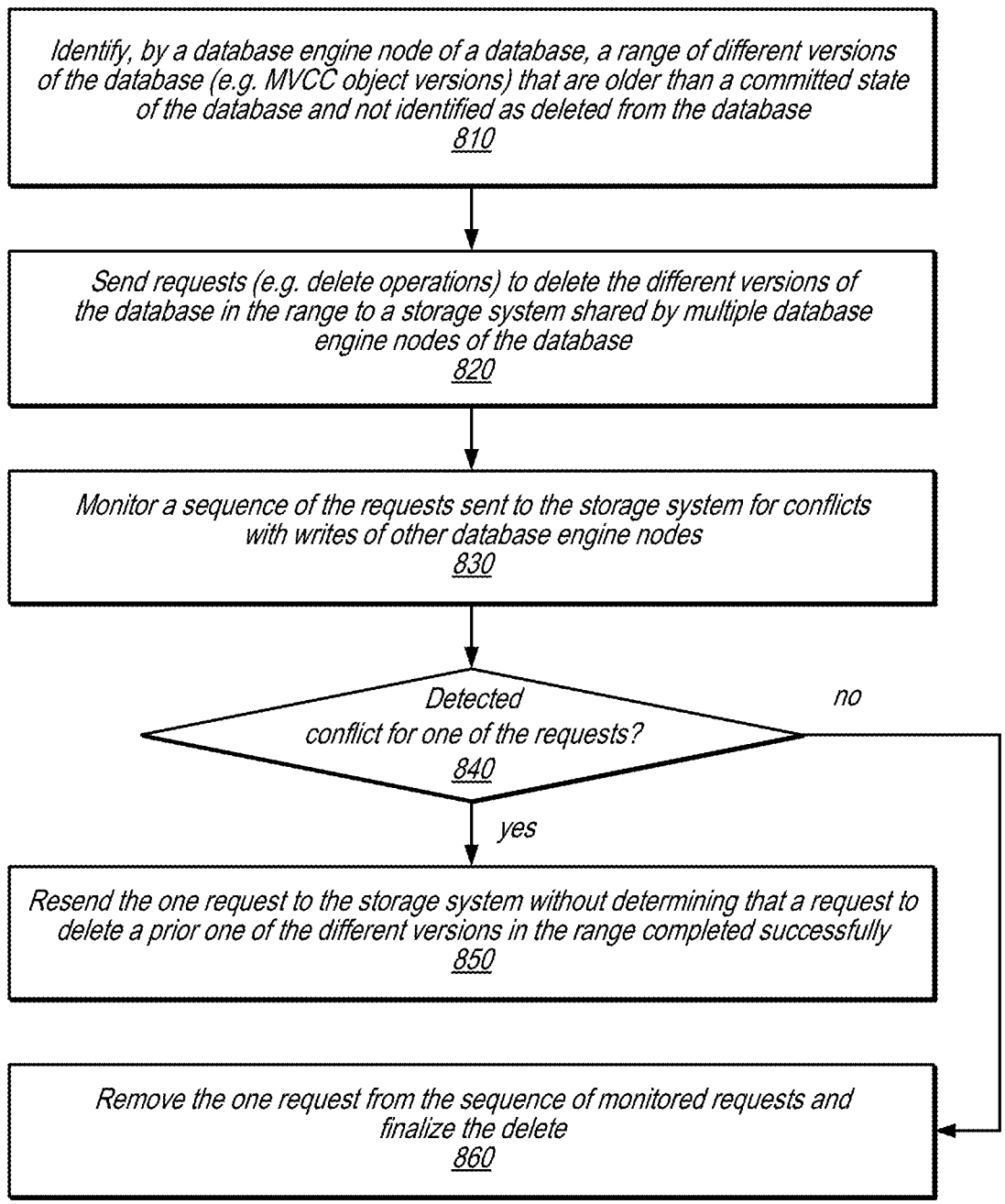
FIG. 8 is a flowchart illustrating a garbage collection process that uses optimistic delete operations and retries deletes in the event of conflicts, according to some embodiments.

FIG. 8 is a flowchart illustrating a garbage collection process that uses optimistic delete operations and retries deletes in the event of conflicts, according to some embodiments. The process depicted in the figure may be implemented by, for example, the database write node 120 of FIG. 1.

At operation 810, a database engine node of a database identifies a range of different versions of the database (e.g. MVCC object versions) that are older than a committed state of the database and not identified as deleted from the database. In some embodiments, the range may be a sequence of delete operations that are placed in a queue, such as the purge queue 154 of FIG. 1. The versions may be old MVCC object versions that are no longer needed. In some embodiments, the versions may be tombstoned data items or object that can be garbage collected. In some embodiments, these versions of objects or items may be invisible to clients of the database. However, they are not truly deleted. Depending on the embodiments, these invisible items or object can only be finally deleted upon the occurrence of certain conditions. In some embodiments, a garbage collector (e.g. garbage collector 150) is used to delete these items or objects.

At operation 820, requests (e.g. delete operations) to delete the different versions of the database in the range are sent to a storage system shared by multiple database engine nodes of the database. In some embodiments, the storage system may be the storage service 160 of FIG. 1. As discussed, the database system may be implemented as an optimistic multi-writer database system, where multiple write nodes can optimistically issue page writes to the shared storage layer without first checking for write conflicts among each other. Accordingly, the delete operations may also be sent optimistically, without regard as to the success or failure of previous delete operations performed by the garbage collector.

At operation 830, a sequence of the requests sent to the storage system are monitored for conflicts with writes of other database engine nodes. In some embodiments, this operation may be performed by the conflict monitor 152 of FIG. 1. In some embodiments, the garbage collector may maintain a purge queue of operations that are monitored for subsequent conflicts or rejections at the storage layer. In some embodiments, each delete operation may be monitored individually. In other embodiments, a group or batch of delete operations may be monitored together as a unit, so as to ease the burden of monitoring on the garbage collector.

At operation 840, a determination is made whether a conflict is detected for one of the requests in the sequences. In some embodiments, this determination may be made from a notification from the storage system. For example, the storage system may send a rejection notification to the database engine node to indicate that a particular delete has a conflict and has been rejected. In some embodiments, the storage system may also send an acknowledgement for accepted delete operations. In some embodiments, the storage system may not send an explicit acknowledgement, and it is up to the database engine node to query the storage layer for the status of delete operations.

If a conflict has been detected for the one request, at operation 850, the one request is resent to the storage system. The resending of the delete request is performed without determining that another request to delete a prior one of the different versions in the range has completed successfully. That is, in some embodiments, the garbage collector will retry rejected delete operations without regard for other delete requests issued by the garbage collector. As discussed, this retry does not violate correctness because the delete operations are generally idempotent (i.e. they can be repeated without causing different effects), and because there is no strict ordering among the delete operations (e.g. because they are already invisible to clients of the database).

If no conflict is detected for the one request, that request is eventually removed from the sequence of monitored requests. Accordingly, the garbage collector will cease monitoring that request. At this point, this delete operation can be finalized, so that any associated metadata can also be deleted. For example, some embodiments of the MVCC protocol may maintain metadata about past transactions or transaction snapshots. However, once all versions of data items or objects associated with an old transaction or snapshot are garbage collected, the transaction or snapshot metadata can also be deleted.

Figure 9:
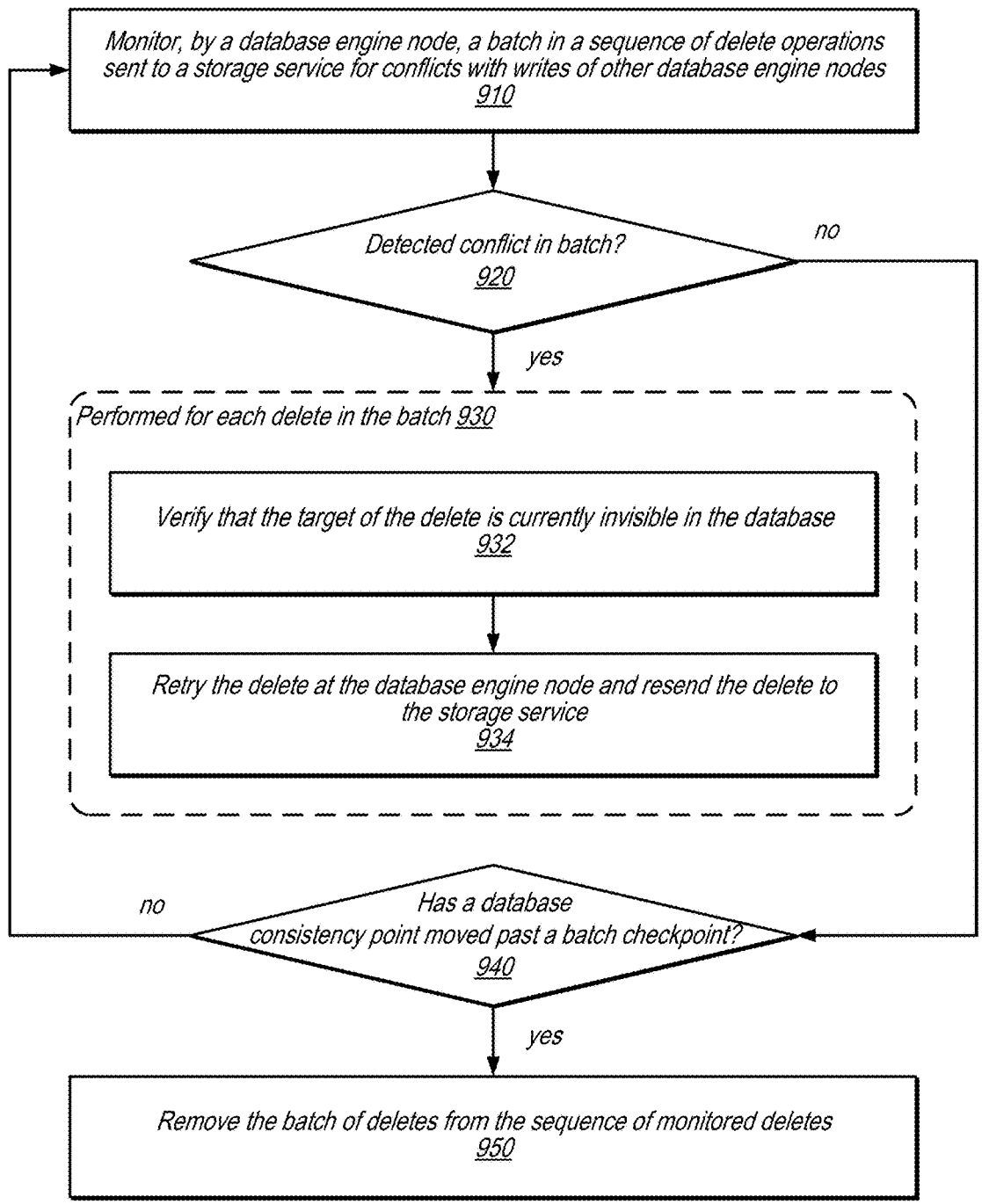
FIG. 9 is a flowchart illustrating a batched retry process that may be used to retry delete operations in a garbage collection that uses optimistic deletes, according to some embodiments.

FIG. 9 is a flowchart illustrating a batched retry process that may be used to retry delete operations in a garbage collection that uses optimistic deletes, according to some embodiments. In some embodiments, the depicted process may be performed by the database write node 120, the garbage collector 150, and/or the conflict monitor 152, as discussed in connection with FIG. 1.

At operation 910, a database engine node monitors a batch of delete operations in a sequence of delete operations sent to a storage service for conflicts with writes of other database engine nodes. In some embodiments, the database engine node may be the database write node 120 of FIG. 1, the storage service may be the storage service 160 of FIG. 1, and the sequence of delete operations may be stored in the purge queue 154 of FIG. 1. In some embodiments, the sequence of delete operations may be divided into multiple batches, which may be ranges of consecutive operations in the sequence. For example, a batch may be the batch 742 of FIG. 7B, or the batch 780 of FIG. 7C. The monitoring may occur in similar fashion as discussed in connection with operation 830 of FIG. 8. For example, detected conflicts for the delete operations may be reported by the storage service to the database engine node, which may then cause the garbage collector to take appropriate action.

At operation 920, a determination is made whether a conflict is detected in the batch. Operation 920 may be performed in similar fashion as discussed for operation 840 of FIG. 8. However, in embodiments where batch retry is employed, the batch of operations may be treated as a single unit, so that if any conflict is detected in any operation in the batch, the entire batch will be retried. In some embodiments, the entire batch of operations may be validated at the same time, and if there are no conflicts, the entire batch may be removed from the queue together as a unit.

If a conflict is detected, the process proceeds to process 930, which is performed for each individual delete in the batch. At operation 932, the database engine node may verify that the target of an individual delete operation (e.g.

a data item or object) is currently invisible in the database. In some embodiments, this step may be performed to ensure that there has been no intervening reinsertion of the data item or object between the initial delete attempt and the retry. In some embodiments, an initially deleted object or item may be reverted back to a visible state due to other conditions in the database. In some embodiments, this verification may be performed by checking with other database nodes in the database, or by reading the object or data item from the storage layer. If it is determined that the target object is now visible for some reason, the retry of the delete may be skipped.

If the target of the delete is still invisible, the process may proceed to operation 934, where the individual delete is retried. As discussed, in some embodiments, the retry may involve reperforming the delete at the database engine node, as well as resending the delete to the storage service. As shown, the process will repeat for all delete operations in the batch, so that the entire batch of deletes will be retried.

If no conflicts are detected in the batch at operation 920, the process proceeds to operation 940, where an additional determination is made whether a database consistency point of the database has moved past a batch checkpoint of the batch. In some embodiments, the database consistency point may be the database consistency point 166 of FIG. 1, and the batch checkpoint may be the checkpoint 760 of FIG. 7B. As discussed, in some embodiments, the database consistency point and batch checkpoint may be LSNs associated with log entries to be added the database log. If the database consistency point is greater than the batch checkpoint, in some embodiments, this indicates that all operations in the batch have been accepted at the storage layer.

If the database consistency point has not advanced past the batch checkpoint, the process loops back to operation 910, where the monitoring of the batch will continue. As discussed, in some embodiments, the depicted process may occur as part of a background garbage collection process, which will wake occasionally to check for these conditions.

If the database consistency point has advanced past the batch checkpoint, the process proceeds to operation 950. At operation 950, the batch of deletes is removed from the sequence of monitored deletes. At this point, the batch of deletes have succeeded at the storage layer, and the they no longer need to be monitored by the garbage collector. In some embodiments, the garbage collector or database engine node may perform some additional tasks to finalize the garbage collection for the batch. In some embodiments, operation 950 may be performed in similar fashion as for operation 860, as discussed in connection with FIG. 8.

Figure 10:
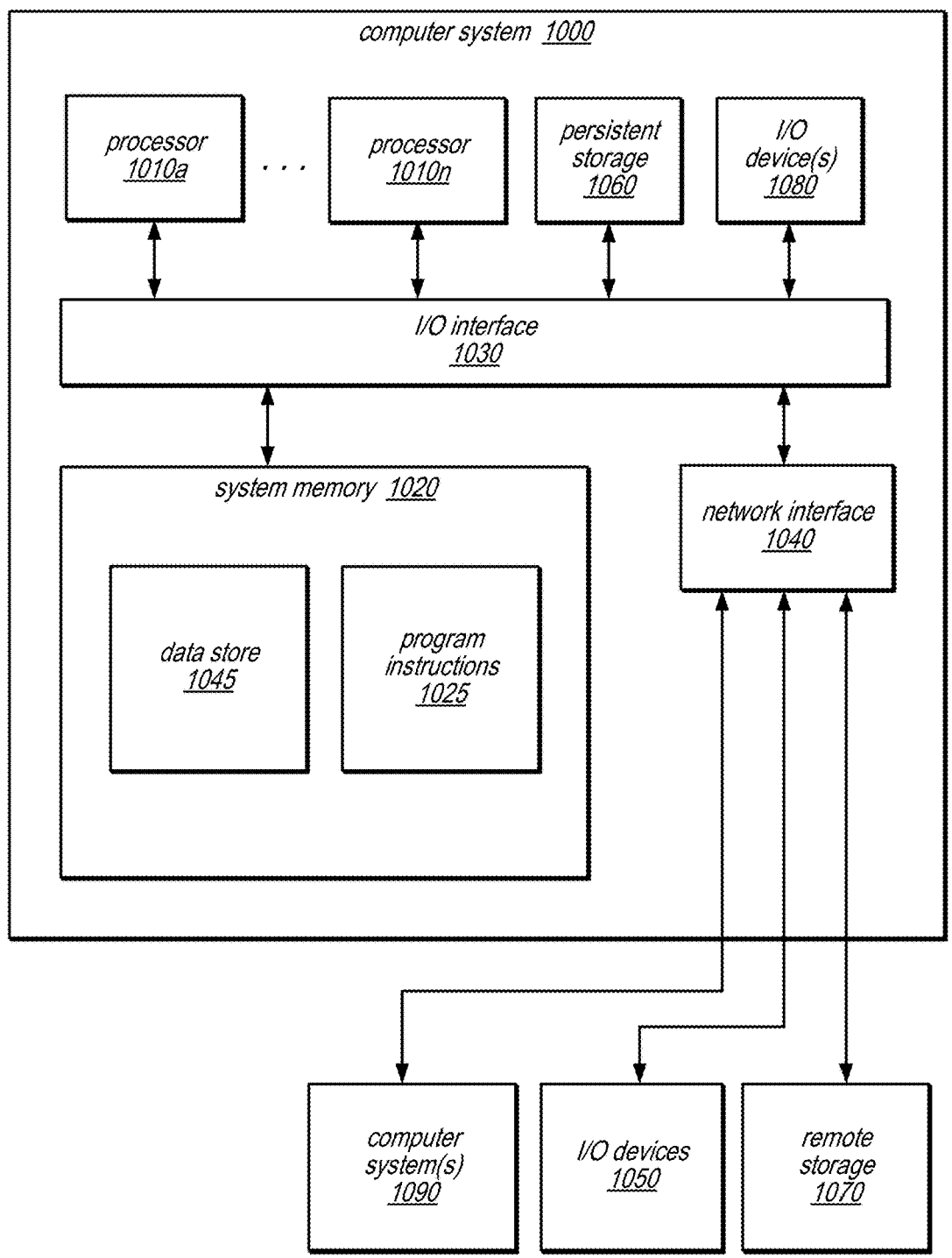
FIG. 10 is a block diagram illustrating an example computer system that can be used to implement one or more portions of an optimistic multi-writer database that employs optimistic delete operations to implement efficient garbage collection, according to some embodiments.

FIG. 10 is a block diagram illustrating an example computer system that can be used to implement one or more portions of an optimistic multi-writer database that employs optimistic delete operations to implement efficient garbage collection, according to some embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
one or more hardware processors with associated memory that implement a plurality of database engine nodes, configured to:
send page write requests to update pages of a database to a storage service that stores the pages;
one or more hardware processors with associated memory that implement the storage service, wherein the storage service is configured to act as an arbiter of conflicts between page write requests of different database engine nodes, including to:
store the page write requests of the database engine nodes in a write queue in a timestamp order, wherein the write queue includes a set of conflict-free page write requests followed by a set of page write requests with potential conflicts;
detect a conflict between two page write requests in the write queue sent by two database engine nodes;
select one of the two database engine nodes as a loser of the detected conflict; and
reject the write request of the loser and notify the loser of the rejection;
wherein at least one of the plurality of database engine nodes is configured to:
identify a range of different versions of objects in the database that are older than a committed state of the database and not finally deleted at the storage service;
perform a local delete of the different versions of objects locally at the database engine node;
send respective page write requests to finally delete the different versions of objects in the range to the storage service, wherein the page write requests are sent to the storage service optimistically before checking for conflicts with page write requests of other database engine nodes;
receive, from the storage service, a notification of rejection of one of the respective page write requests to finally delete one of the different versions in the range; and
in response to the notification of rejection, resend the one page write request to finally delete one of the different versions in the range to the storage service optimistically and without a rollback of the local delete.

2. The system of claim 1, wherein the database engine node is configured to:
implement a multi-version concurrency control (MVCC) protocol, wherein individual write transactions on the database generate new versions of data items in the database; and
to identify the range of different versions of objects, the database engine node is configured to determine versions of data items generated as a result of the MVCC protocol to be garbage collected.

3. The system of claim 1, wherein the database engine node is configured to:
generate tombstoned data items responsive to delete operations on the data items; and
to identify the range of different versions of objects, the database engine node is configured to determine tombstoned data items to be finally deleted.

4. The system of claim 1, wherein the database engine node is configured to:
monitor a sequence of the respective page write requests sent to the storage service; and
responsive to the notification of rejection, retry, at the database engine node, a plurality of page write requests in the monitored sequence after the one page write request.

5. The system of claim 1, wherein:
the database engine nodes are implemented in a database service provided by a service provider network, wherein the database service provides a plurality of databases for a plurality of different clients; and
the storage service is provided by the service provider network.

6. A method, comprising:
performing, by one or more hardware processors with associated memory implementing a storage service configured to act as an arbiter of conflicts between page write requests of a plurality of database engine nodes authorized to write to a database:
storing a write queue of page write requests from the database engines in a timestamp order, wherein the write queue includes a set of conflict-free page write requests followed by a set of page write requests with Potential conflicts;
selecting one of two database engine nodes as a loser of a detected conflict between two write requests of the two database engine nodes in the write queue; and
rejecting the write request of the loser and notify the loser of the rejection;
performing, by one or more hardware processors with associated memory implementing one of the plurality of database engines:

identifying a range of different versions of objects in the database that are older than a committed state of the database and not finally deleted at the storage service;

performing a local delete of the different versions of objects locally at the database engine;

sending respective page write requests to finally delete the different versions of objects in the range to the storage service, wherein the page write requests are sent to the storage service optimistically before checking for conflicts with page write requests of other database engines;

receiving, from the storage service, a notification of rejection of one of the respective page write requests to finally delete one of the different versions in the range; and in response to the notification of rejection, resending the one page write request to finally delete one of the different versions in the range to the storage service optimistically and without a rollback of the local delete.

7. The method of claim 6, wherein:

the database engine is implemented as a database engine node in a database service provided by a service provider network, wherein the database service provides a plurality of databases for a plurality of different clients; and the storage service is provided by the service provider network.

8. The method of claim 6, wherein:

the database engine implements a multi-version concurrency control (MVCC) protocol, wherein individual write transactions on the database generate new versions of data items in the database; and the identifying of the range of different versions comprises determining versions of data items generated as a result of the MVCC protocol to be garbage collected.

9. The method of claim 6, wherein:

the database engine is configured to generate tombstoned data items responsive to delete operations on the data items; and the identifying of the range of different versions comprises determining tombstoned data items to be finally deleted.

10. The method of claim 6, further comprising performing, by the database engine:

monitoring a sequence of the respective page write requests sent to the storage service; and responsive to the notification of rejection, retrying a batch of multiple page write requests in the monitored sequence at the database engine.

11. The method of claim 10, wherein the retrying of the batch of page write requests comprises retrying all page write requests after the one page write request in the sequence.

12. The method of claim 10, further comprising performing, by the database engine:

responsive to a determination that all page write requests in another batch of multiple page write requests in the monitored sequence are accepted without conflict at the storage service, removing the other batch from the monitored sequence.

13. The method of claim 12, wherein determining that all page write requests in the other batch are accepted without conflict at the storage service comprises determining that a consistency point of the database has advanced past a last log sequence number in the batch.

14. The method of claim 12, wherein the other batch of multiple page write requests includes all page write requests in the monitored sequence after a moving checkpoint, and the moving checkpoint is periodically advanced based at least in part on a consistency point of the database.

15. The method of claim 6, further comprising performing, by the database engine:

prior to the resending of the one page write request, verifying that a version of an object to be finally deleted by the one page write request is currently invisible in the database; and wherein the resending of the one page write request is performed based at least in part on the verification.

16. One or more non-transitory computer-accessible storage media storing program instructions that when executed on or across one or more processors implement one of a plurality of database engines in a database system with a storage service, wherein the storage service is configured to act as an arbiter of conflicts between page write requests of the database engines, including to:

store a write queue of page write requests from the database engines in a timestamp order, wherein the write queue includes a set of conflict-free page write requests followed by a set of page write requests with Potential conflicts;

select one of two database engine nodes as a loser of a detected conflict between two write requests of the two database engine nodes in the write queue; and reject the write request of the loser and notify the loser of the rejection;

wherein the program instructions when executed on or across one or more processors causes the database engine to:

identify a range of different versions of objects in the database that are older than a committed state of the database and not finally deleted at the storage service;

perform a local delete of the different versions of objects locally at the database engine node;

send respective page write requests to finally delete the different versions of objects in the range to the storage service, wherein the page write requests are sent to the storage service optimistically before checking for conflicts with page write requests of other database engines;

receive, from the storage service, a notification of rejection of one of the respective page write requests to finally delete one of the different versions in the range; and in response to the notification of rejection, resend the one page write request to finally delete one of the different versions in the range to the storage service optimistically and without a rollback of the local delete.

17. The one or more non-transitory computer-accessible storage media of claim 16, wherein:

the database engine implements a multi-version concurrency control (MVCC) protocol, wherein individual write transactions on the database generate new versions of data items in the database; and to identify the range of different versions, the program instructions when executed on or across the one or more processors cause the database engine to determine versions of data items generated as a result of the MVCC protocol to be garbage collected.

18. The one or more non-transitory computer-accessible storage media of claim 16, wherein:
- the database engine is configured to generate tombstoned data items responsive to delete operations on the data items; and
- to identify the range of different versions, the program instructions when executed on or across the one or more processors cause the database engine to determine tombstoned data items to be finally deleted.

19. The one or more non-transitory computer-accessible storage media of claim 16, wherein the program instructions when executed on or across the one or more processors cause the database engine to:
- monitor a sequence of the respective page write requests sent to the storage service; and
- responsive to the notification of rejection, retry a plurality of page write requests in the monitored sequence at the database engine.

20. The one or more non-transitory computer-accessible storage media of claim 19, wherein the program instructions when executed on or across the one or more processors cause the database engine to:
- responsive to a determination that the one page write request and all preceding page write requests in the sequence are accepted without conflict at the storage service, remove the one page write request and all preceding page write requests from the sequence being monitored.

* * * * *